US012767362B2

(12) United States Patent
Turvey et al.

(10) Patent No.: US 12,767,362 B2
(45) Date of Patent: Oct. 20, 2026

(54) BASE STATIONS FOR UNMANNED AERIAL VEHICLES AND STANDS FOR USE THEREWITH

(71) Applicant: Skydio, Inc., San Mateo, CA (US)

(72) Inventors: George Oliver Turvey, Brookdale, CA (US); Yee Shan Woo, Campbell, CA (US); Shun Yao, Fremont, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 19/222,069

(22) Filed: May 29, 2025

(65) Prior Publication Data

US 2026/0048878 A1 Feb. 19, 2026

Related U.S. Application Data

(60) Provisional application No. 63/683,520, filed on Aug. 15, 2024.

(51) Int. Cl.

*B64U 70/90* (2023.01)
*B64U 50/37* (2023.01)
*B64U 70/99* (2023.01)
*B64U 80/25* (2023.01)
*B64U 80/70* (2023.01)
*B64U 10/14* (2023.01)

(Continued)

(52) U.S. Cl.

CPC ............. *B64U 70/90* (2023.01); *B64U 50/37* (2023.01); *B64U 80/25* (2023.01); *B64U 80/70* (2023.01); *B64U 10/14* (2023.01); *B64U 70/92* (2023.01); *B64U 70/97* (2023.01); *B64U 70/99* (2023.01)

(58) Field of Classification Search

CPC ........ B64U 80/70; B64U 80/25; B64U 70/92; B64U 70/97; B64U 10/14; B64U 70/99

See application file for complete search history.

(56) References Cited

U.S. PATENT DOCUMENTS

| | | | |
|---|---|---|---|
| 3,253,806 | A | 5/1966 | Eickmann |
| 3,417,729 | A | 12/1968 | Gilday et al. |
| 3,483,696 | A | 12/1969 | Gilbert et al. |

(Continued)

FOREIGN PATENT DOCUMENTS

| | | | |
|---|---|---|---|
| CN | 115636119 | A | 1/2023 |
| EP | 4410686 | A1 | 8/2024 |
| WO | 2019061519 | A1 | 4/2019 |

OTHER PUBLICATIONS

International Search Report and Written Opinion mailed on Jan. 23, 2026 in corresponding PCT Application No. PCT/US2025/041863.

*Primary Examiner* — Rodney A Bonnette

(74) *Attorney, Agent, or Firm* — Young Basile Hanlon & MacFarlane, P.C.

(57) ABSTRACT

A base station for a UAV includes a base and a roof assembly movably coupled to the base and movable between a closed position, in which the roof assembly is configured to enclose a landing platform, and an open position, in which the landing platform is unobstructed by the roof assembly. The base station further includes a stand that includes a first leg, a second leg, a frame extending between the first leg and the second leg, and a spreader plate supported by at least one of the first leg and the second leg, wherein the spreader plate is configured to support the base. The stand is configured to support one or more of power transmission and data transmission to the base station via the stand.

24 Claims, 20 Drawing Sheets

(51) Int. Cl.

| | |
|---|---|
| *B64U 70/92* | (2023.01) |
| *B64U 70/97* | (2023.01) |

(56) References Cited

U.S. PATENT DOCUMENTS 3,575,527 A 4/1971 Watanabe et al.
3,805,723 A 4/1974 Bernaerts
4,262,712 A 4/1981 Young
4,865,248 A 9/1989 Barth
4,954,962 A 9/1990 Evans, Jr. et al.
5,040,116 A 8/1991 Evans, Jr. et al.
5,116,273 A 5/1992 Chan
5,283,739 A 2/1994 Summerville et al.
5,371,581 A 12/1994 Wangler et al.
5,386,462 A 1/1995 Schlamp
5,452,374 A 9/1995 Cullen et al.
5,497,236 A 3/1996 Wolff et al.
5,731,884 A 3/1998 Inoue
5,842,667 A 12/1998 Jones
5,847,522 A 12/1998 Barba
5,901,253 A 5/1999 Tretter
5,995,898 A 11/1999 Tuttle
6,031,612 A 2/2000 Shirley
6,073,283 A 6/2000 Zheng
6,079,668 A 6/2000 Brown
6,266,577 B1 7/2001 Popp et al.
6,344,796 B1 2/2002 Ogilvie et al.
6,374,155 B1 4/2002 Wallach et al.
6,426,699 B1 7/2002 Porter
6,507,670 B1 1/2003 Moed
6,543,983 B1 4/2003 Felder et al.
6,636,781 B1 10/2003 Shen et al.
6,676,460 B1 1/2004 Motsenbocker
6,690,997 B2 2/2004 Rivalto
6,694,217 B2 2/2004 Bloom
6,705,523 B1 3/2004 Stamm et al.
6,804,607 B1 10/2004 Wood
6,919,803 B2 7/2005 Breed
6,954,290 B1 10/2005 Braudaway et al.
6,961,711 B1 11/2005 Chee
6,965,440 B1 11/2005 Nakagiri et al.
6,970,838 B1 11/2005 Kamath et al.
7,006,952 B1 2/2006 Matsumoto et al.
7,016,536 B1 3/2006 Ling et al.
7,031,519 B2 4/2006 Elmenhurst
7,082,883 B1 8/2006 Arias
7,129,817 B2 10/2006 Yamagishi
7,133,743 B2 11/2006 Tilles et al.
7,145,699 B2 12/2006 Dolan
7,149,611 B2 12/2006 Beck et al.
7,171,879 B2 2/2007 Gass et al.
7,188,513 B2 3/2007 Wilson
7,334,755 B2 2/2008 Svoboda
7,335,071 B1 2/2008 Motsenbocker
7,337,686 B2 3/2008 Sagi-Dolev
7,337,944 B2 3/2008 Devar
7,339,993 B1 3/2008 Brooks et al.
7,459,880 B1 12/2008 Rosen
7,639,386 B1 12/2009 Siegel et al.
7,668,404 B2 2/2010 Adams et al.
7,673,831 B2 3/2010 Steele et al.
7,685,953 B2 3/2010 Giles
7,693,745 B1 4/2010 Pomerantz et al.
7,894,939 B2 2/2011 Zini et al.
7,925,375 B2 4/2011 Schininger et al.
7,946,526 B2 5/2011 Zimet
7,946,530 B1 5/2011 Talmage
7,966,093 B2 6/2011 Zhuk
8,015,023 B1 9/2011 Lee et al.
8,052,081 B2 11/2011 Olm et al.
8,078,317 B2 12/2011 Allinson et al.
8,126,642 B2 2/2012 Trepagnier et al.
8,131,607 B2 3/2012 Park et al.
8,145,351 B2 3/2012 Schininger et al.
8,195,328 B2 6/2012 Mallett et al.
8,245,469 B2 8/2012 Rubel et al.
8,256,172 B2 9/2012 Benson
8,286,236 B2 10/2012 Jung et al.
8,412,588 B1 4/2013 Bodell et al.
8,418,959 B2 4/2013 Kang et al.
8,429,754 B2 4/2013 Jung et al.
8,511,606 B1 8/2013 Lutke et al.
8,599,027 B2 12/2013 Sanchez
8,602,349 B2 12/2013 Petrov
8,639,400 B1 1/2014 Wong
8,736,820 B2 5/2014 Choe et al.
8,752,166 B2 6/2014 Jung et al.
8,791,790 B2 7/2014 Robertson et al.
8,874,301 B1 10/2014 Rao et al.
8,899,903 B1 12/2014 Saad et al.
8,948,914 B2 2/2015 Zini et al.
8,956,100 B2 2/2015 Davi et al.
8,989,053 B1 3/2015 Skaaksrud et al.
9,033,285 B2 5/2015 Iden et al.
9,050,997 B1 6/2015 Schramm
9,051,043 B1 6/2015 Peeters et al.
9,056,676 B1 6/2015 Wang
9,079,587 B1 7/2015 Rupp et al.
9,126,693 B1 9/2015 Shi et al.
9,139,310 B1 * 9/2015 Wang .................... G05D 1/102
9,163,909 B2 10/2015 Chengalva
9,193,452 B2 11/2015 Carreker
9,195,959 B1 11/2015 Lopez et al.
9,216,587 B2 12/2015 Ando et al.
9,216,857 B1 12/2015 Kalyan et al.
9,235,213 B2 1/2016 Villamar
9,244,147 B1 1/2016 Soundararajan et al.
9,256,852 B1 2/2016 Myllymaki
9,261,578 B2 2/2016 Im et al.
9,290,277 B2 3/2016 You
9,321,531 B1 4/2016 Takayama et al.
9,336,635 B2 5/2016 Robertson et al.
9,358,975 B1 6/2016 Watts
9,381,916 B1 7/2016 Zhu et al.
9,387,928 B1 7/2016 Gentry et al.
9,397,518 B1 7/2016 Theobald
9,404,761 B2 8/2016 Meuleau
9,409,644 B2 8/2016 Stanek et al.
9,411,337 B1 8/2016 Theobald et al.
9,412,280 B1 8/2016 Zwillinger et al.
9,421,869 B1 8/2016 Ananthanarayanan et al.
9,436,183 B2 9/2016 Thakur et al.
9,436,926 B2 9/2016 Cousins et al.
9,446,858 B2 9/2016 Hess
9,448,559 B2 9/2016 Kojo et al.
9,457,899 B2 10/2016 Duffy et al.
9,489,490 B1 11/2016 Theobald
9,527,605 B1 12/2016 Gentry et al.
9,535,421 B1 1/2017 Canoso et al.
9,545,852 B2 1/2017 Streett
9,551,989 B2 1/2017 Scarlatti et al.
9,561,941 B1 2/2017 Watts
9,563,201 B1 2/2017 Tofte et al.
9,568,335 B2 2/2017 Thakur et al.
9,582,950 B2 2/2017 Shimizu et al.
9,589,448 B1 3/2017 Schneider et al.
9,600,645 B2 3/2017 Fadell et al.
9,619,776 B1 4/2017 Ford et al.
9,623,562 B1 4/2017 Watts
9,643,722 B1 5/2017 Myslinski
9,650,136 B1 5/2017 Haskin et al.
9,652,912 B2 5/2017 Fadell et al.
9,656,805 B1 5/2017 Evans et al.
9,671,791 B1 6/2017 Paczan
9,676,481 B1 6/2017 Buchmueller
9,677,564 B1 6/2017 Woodworth et al.
9,697,730 B2 7/2017 Thakur et al.
9,718,564 B1 8/2017 Beckman et al.
9,720,414 B1 8/2017 Theobald
9,731,821 B2 8/2017 Hoareau et al.
9,733,646 B1 8/2017 Nusser et al.
9,746,852 B1 8/2017 Watts et al.
9,746,853 B2 8/2017 Scheepjens et al.
9,778,653 B1 10/2017 McClintock et al.

(56) References Cited

U.S. PATENT DOCUMENTS

| | | | | |
|---|---|---|---|---|
| 9,783,075 | B2 | 10/2017 | Henry et al. | |
| 9,783,301 | B2 | 10/2017 | Schliwa et al. | |
| 9,786,187 | B1 | 10/2017 | Bar-Zeev et al. | |
| 9,796,529 | B1 | 10/2017 | Hoareau et al. | |
| 9,815,633 | B1 | 11/2017 | Kisser et al. | |
| 9,828,092 | B1 | 11/2017 | Navot et al. | |
| 9,858,604 | B2 | 1/2018 | Apsley et al. | |
| 9,886,035 | B1 | 2/2018 | Watts et al. | |
| 9,896,204 | B1 | 2/2018 | Willison | |
| 9,957,045 | B1 | 5/2018 | Daly | |
| 9,959,771 | B1 | 5/2018 | Carlson | |
| 9,974,612 | B2 | 5/2018 | Pinter et al. | |
| 10,011,352 | B1 | 7/2018 | Dahlstrom | |
| 10,022,753 | B2 | 7/2018 | Chelian et al. | |
| 10,048,697 | B1 | 8/2018 | Theobald | |
| 10,099,561 | B1 | 10/2018 | Ananthanarayanan et al. | |
| 10,099,785 | B1 | 10/2018 | Gonzalez | |
| 10,108,185 | B1 | 10/2018 | Theobald | |
| 10,112,712 | B1 | 10/2018 | Gentry et al. | |
| 10,137,984 | B1 | 11/2018 | Flick | |
| 10,176,722 | B1 | 1/2019 | Boyd et al. | |
| 10,239,638 | B1 | 3/2019 | Cohen et al. | |
| 10,268,208 | B1 | 4/2019 | Hopwood Thomas | |
| 10,287,033 | B2 | 5/2019 | Hu | |
| 10,310,501 | B2 | 6/2019 | Greenberger et al. | |
| 10,418,830 | B1 | 9/2019 | Parodi et al. | |
| 10,434,885 | B2 | 10/2019 | Antonini et al. | |
| 10,467,685 | B1 | 11/2019 | Brisson et al. | |
| 10,526,094 | B2 | 1/2020 | Cheng et al. | |
| 10,558,226 | B1 | 2/2020 | Bigdeli | |
| 10,577,126 | B2 | 3/2020 | Mozer | |
| 10,618,675 | B2 | 4/2020 | Conyers et al. | |
| 10,640,234 | B1 * | 5/2020 | Douglas | B64U 50/37 |
| 10,719,080 | B2 | 7/2020 | Zhang et al. | |
| 10,745,102 | B2 | 8/2020 | Nysæter et al. | |
| 10,745,132 | B1 | 8/2020 | Kimchi | |
| 10,780,988 | B2 | 9/2020 | Buchmueller et al. | |
| D903,576 | S | 12/2020 | Feldman | |
| 10,860,115 | B1 | 12/2020 | Tran | |
| 10,875,648 | B2 | 12/2020 | Schmalzried et al. | |
| 10,899,436 | B2 | 1/2021 | Gentry | |
| 10,967,970 | B2 | 4/2021 | Van Niekerk et al. | |
| 11,007,290 | B2 | 5/2021 | Kreitenberg et al. | |
| 11,079,752 | B1 | 8/2021 | Lombardini | |
| 11,111,033 | B1 | 9/2021 | Burks et al. | |
| D932,369 | S | 10/2021 | Passley | |
| 11,148,805 | B2 | 10/2021 | Cooper et al. | |
| 11,148,808 | B2 | 10/2021 | Wiggerich | |
| 11,164,149 | B1 | 11/2021 | Williams et al. | |
| 11,180,253 | B1 | 11/2021 | Seeley | |
| 11,235,890 | B1 | 2/2022 | Dahlstrom et al. | |
| 11,292,620 | B1 | 4/2022 | Molony | |
| 11,370,561 | B2 | 6/2022 | Ratajczak et al. | |
| 11,459,117 | B1 | 10/2022 | Shapiro | |
| 11,511,886 | B1 | 11/2022 | Tian | |
| 11,534,801 | B2 | 12/2022 | Volta et al. | |
| 11,572,197 | B1 | 2/2023 | Nevdahs et al. | |
| 11,597,515 | B2 | 3/2023 | Passley | |
| 11,597,516 | B1 | 3/2023 | Klinkmueller et al. | |
| 11,603,218 | B2 | 3/2023 | Fisher et al. | |
| 11,603,219 | B2 | 3/2023 | Ratajczak et al. | |
| 11,619,952 | B2 | 4/2023 | Kwon et al. | |
| 11,628,932 | B2 | 4/2023 | Seung et al. | |
| 11,636,771 | B2 | 4/2023 | Barker et al. | |
| 11,641,966 | B2 | 5/2023 | Nakanishi | |
| 11,649,050 | B1 | 5/2023 | Miller | |
| 11,667,402 | B2 | 6/2023 | Liske et al. | |
| 11,673,690 | B2 | 6/2023 | Dayan et al. | |
| 11,710,092 | B2 | 7/2023 | Dearing | |
| 11,713,136 | B2 | 8/2023 | Foggia et al. | |
| 11,714,189 | B2 | 8/2023 | Padmanabhan et al. | |
| 11,738,867 | B2 | 8/2023 | Ehasoo et al. | |
| 11,741,422 | B2 | 8/2023 | Gil et al. | |
| 11,748,688 | B2 | 9/2023 | Ur | |
| 11,760,485 | B2 | 9/2023 | Wabnegger et al. | |
| 11,767,129 | B2 | 9/2023 | Warwick et al. | |
| 11,772,814 | B2 | 10/2023 | Dubois et al. | |
| 11,776,136 | B1 | 10/2023 | Pachikov et al. | |
| 11,780,606 | B2 | 10/2023 | Carthew et al. | |
| 11,794,894 | B2 | 10/2023 | Brock et al. | |
| 11,794,922 | B1 | 10/2023 | Twyford et al. | |
| 11,808,580 | B1 | 11/2023 | Ebrahimi Afrouzi et al. | |
| 11,814,191 | B2 | 11/2023 | Cheng et al. | |
| 11,814,241 | B2 | 11/2023 | Tian | |
| D1,008,873 | S | 12/2023 | Lin | |
| 11,840,152 | B2 | 12/2023 | Fisher et al. | |
| 11,851,162 | B1 | 12/2023 | Daube et al. | |
| 11,851,209 | B2 | 12/2023 | Fisher et al. | |
| 11,858,662 | B2 | 1/2024 | Gil | |
| 11,866,168 | B2 | 1/2024 | Cooper et al. | |
| 11,868,146 | B2 | 1/2024 | Yasunaga et al. | |
| 11,873,116 | B2 | 1/2024 | Kozlenko et al. | |
| 11,884,422 | B2 | 1/2024 | Lowe et al. | |
| 11,898,368 | B2 | 2/2024 | Blake et al. | |
| 11,900,823 | B2 | 2/2024 | Surace | |
| 11,932,315 | B2 | 3/2024 | Hwang et al. | |
| 11,933,613 | B2 | 3/2024 | Michini et al. | |
| 11,939,046 | B1 | 3/2024 | Berry et al. | |
| 11,939,057 | B2 | 3/2024 | Hamm | |
| 11,939,080 | B2 | 3/2024 | Cowden | |
| 11,939,083 | B2 | 3/2024 | Baklycki | |
| 11,986,115 | B2 | 5/2024 | Walsh et al. | |
| 12,017,553 | B2 | 6/2024 | Lowe et al. | |
| 12,020,582 | B2 | 6/2024 | Barker et al. | |
| 12,059,089 | B1 | 8/2024 | Dunn | |
| 12,084,211 | B2 | 9/2024 | Li et al. | |
| 12,091,194 | B2 | 9/2024 | Wang et al. | |
| 12,099,370 | B2 | 9/2024 | Jourdan et al. | |
| 12,134,329 | B2 | 11/2024 | Todeschini | |
| 12,168,533 | B1 | 12/2024 | Hinman et al. | |
| 12,172,777 | B2 | 12/2024 | Carthew et al. | |
| 12,183,940 | B2 | 12/2024 | Bell | |
| 12,195,213 | B2 | 1/2025 | Qi et al. | |
| 12,227,318 | B1 | 2/2025 | Bata et al. | |
| 12,246,610 | B2 | 3/2025 | Altenhofen et al. | |
| 12,275,318 | B2 | 4/2025 | Lowe et al. | |
| 12,280,901 | B2 | 4/2025 | Smith et al. | |
| 12,330,811 | B2 | 6/2025 | Fisher et al. | |
| 12,378,002 | B2 | 8/2025 | Kozlenko et al. | |
| 12,378,017 | B2 | 8/2025 | Woo et al. | |
| 12,415,635 | B2 | 9/2025 | Berthelet et al. | |
| 2001/0045449 | A1 | 11/2001 | Shannon | |
| 2002/0016726 | A1 | 2/2002 | Ross | |
| 2002/0035450 | A1 | 3/2002 | Thackston | |
| 2002/0072979 | A1 | 6/2002 | Sinha et al. | |
| 2002/0087375 | A1 | 7/2002 | Griffin et al. | |
| 2002/0107751 | A1 | 8/2002 | Rajagopalan et al. | |
| 2002/0111914 | A1 | 8/2002 | Terada et al. | |
| 2002/0116289 | A1 | 8/2002 | Yang | |
| 2002/0123930 | A1 | 9/2002 | Boyd et al. | |
| 2002/0156645 | A1 | 10/2002 | Hansen | |
| 2003/0040980 | A1 | 2/2003 | Nakajima et al. | |
| 2003/0072031 | A1 | 4/2003 | Kuwata et al. | |
| 2003/0121968 | A1 | 7/2003 | Miller et al. | |
| 2003/0141411 | A1 | 7/2003 | Pandya et al. | |
| 2004/0002898 | A1 | 1/2004 | Kuhlmann et al. | |
| 2004/0068416 | A1 | 4/2004 | Solomon | |
| 2004/0112660 | A1 | 6/2004 | Johansson et al. | |
| 2004/0160335 | A1 | 8/2004 | Reitmeier | |
| 2004/0162638 | A1 | 8/2004 | Solomon | |
| 2004/0256519 | A1 | 12/2004 | Ellis et al. | |
| 2004/0257199 | A1 | 12/2004 | Fitzgibbon et al. | |
| 2005/0061910 | A1 | 3/2005 | Wobben | |
| 2005/0068178 | A1 | 3/2005 | Lee et al. | |
| 2005/0093865 | A1 | 5/2005 | Jia | |
| 2005/0102240 | A1 | 5/2005 | Misra et al. | |
| 2005/0178894 | A1 | 8/2005 | McGeer et al. | |
| 2005/0244060 | A1 | 11/2005 | Nagarajan et al. | |
| 2005/0285934 | A1 | 12/2005 | Carter | |
| 2006/0038067 | A1 | 2/2006 | Dennis | |
| 2006/0053534 | A1 | 3/2006 | Mullen | |
| 2006/0118162 | A1 | 6/2006 | Saelzer et al. | |
| 2006/0136237 | A1 | 6/2006 | Spiegel et al. | |
| 2006/0249622 | A1 | 11/2006 | Steele | |

(56) References Cited

U.S. PATENT DOCUMENTS

2006/0287829 A1 12/2006 Pashko-Paschenko
2007/0016496 A1 1/2007 Bar et al.
2007/0073552 A1 3/2007 Hileman
2007/0102565 A1 5/2007 Speer et al.
2007/0150375 A1 6/2007 Yang
2007/0170237 A1 7/2007 Neff
2007/0176432 A1 8/2007 Rolt
2007/0210953 A1 9/2007 Abraham et al.
2007/0233337 A1 10/2007 Plishner
2007/0244763 A1 10/2007 Williams et al.
2007/0246601 A1 10/2007 Layton
2007/0262195 A1 11/2007 Bulaga et al.
2007/0293978 A1 12/2007 Wurman et al.
2008/0012697 A1 1/2008 Smith et al.
2008/0027591 A1 1/2008 Lenser et al.
2008/0100258 A1 5/2008 Ward
2008/0109246 A1 5/2008 Russell
2008/0111816 A1 5/2008 Abraham et al.
2008/0141921 A1 6/2008 Hinderks
2008/0150679 A1 6/2008 Bloomfield
2008/0154659 A1 6/2008 Bettes et al.
2008/0167817 A1 7/2008 Hessler et al.
2008/0184906 A1 8/2008 Kejha
2008/0189012 A1 8/2008 Kaufmann
2008/0217486 A1 9/2008 Colten et al.
2008/0301009 A1 12/2008 Plaster et al.
2009/0027253 A1 1/2009 van Tooren et al.
2009/0057486 A1 3/2009 Becht et al.
2009/0062974 A1 3/2009 Tamamoto et al.
2009/0063166 A1 3/2009 Palmer
2009/0079388 A1 3/2009 Reddy
2009/0086275 A1 4/2009 Liang et al.
2009/0091435 A1 4/2009 Bolourchi
2009/0106124 A1 4/2009 Yang
2009/0149985 A1 6/2009 Chirnomas
2009/0164379 A1 6/2009 Jung et al.
2009/0165127 A1 6/2009 Jung et al.
2009/0216394 A1 8/2009 Heppe et al.
2009/0236470 A1 9/2009 Goossen et al.
2009/0254457 A1 10/2009 Folsom
2009/0254482 A1 10/2009 Vadlamani et al.
2009/0299903 A1 12/2009 Hung et al.
2009/0303507 A1 12/2009 Abeloe
2009/0314883 A1 12/2009 Arlton et al.
2010/0007479 A1 1/2010 Smith
2010/0030608 A1 2/2010 Kaminsky et al.
2010/0031351 A1 2/2010 Jung et al.
2010/0038480 A1 2/2010 Wu et al.
2010/0088163 A1 4/2010 Davidson et al.
2010/0088175 A1 4/2010 Lundquist
2010/0100269 A1 4/2010 Ekhaguere et al.
2010/0169185 A1 7/2010 Cottingham
2010/0170993 A1 7/2010 Misegades
2010/0206145 A1 8/2010 Tetelbaum et al.
2010/0287065 A1 11/2010 Alivandi
2010/0299067 A1 11/2010 McCollough et al.
2010/0299222 A1 11/2010 Hamilton et al.
2010/0320313 A1 12/2010 Hanafin et al.
2011/0035149 A1 2/2011 McAndrew et al.
2011/0068224 A1 3/2011 Kang et al.
2011/0074570 A1 3/2011 Feldstein et al.
2011/0087350 A1 4/2011 Fogel et al.
2011/0112761 A1 5/2011 Hurley et al.
2011/0153052 A1 6/2011 Pettibone et al.
2011/0166707 A1 7/2011 Romanov et al.
2011/0174925 A1 7/2011 Ying
2011/0178711 A1 7/2011 Christoph
2011/0210866 A1 9/2011 David et al.
2011/0227435 A1 9/2011 Maeda
2011/0246331 A1 10/2011 Luther et al.
2011/0253831 A1 10/2011 Cheng
2011/0264311 A1 10/2011 Lee et al.
2011/0282476 A1 11/2011 Hegemier et al.
2011/0301787 A1 12/2011 Chaperon et al.
2011/0313878 A1 12/2011 Norman
2012/0039694 A1 2/2012 Suzanne
2012/0078592 A1 3/2012 Sims
2012/0080556 A1 4/2012 Root
2012/0091260 A1 4/2012 Callou
2012/0109419 A1 5/2012 Mercado
2012/0219397 A1 8/2012 Baker
2012/0221438 A1 8/2012 Cook et al.
2012/0227389 A1 9/2012 Hinderks
2012/0229325 A1 9/2012 Dutruc
2012/0234969 A1 9/2012 Savoye et al.
2012/0235606 A1 9/2012 Takeuchi
2012/0323365 A1 12/2012 Taylor et al.
2013/0006739 A1 1/2013 Horvitz et al.
2013/0073477 A1 3/2013 Grinberg
2013/0081245 A1 4/2013 Vavrina et al.
2013/0093582 A1 4/2013 Walsh et al.
2013/0126611 A1 5/2013 Kangas et al.
2013/0148123 A1 6/2013 Hayashi
2013/0193269 A1 8/2013 Zwaan et al.
2013/0206915 A1 8/2013 Desaulniers
2013/0218446 A1 8/2013 Bradley et al.
2013/0218799 A1 8/2013 Lehmann et al.
2013/0233964 A1 9/2013 Woodworth et al.
2013/0261792 A1 10/2013 Gupta et al.
2013/0262252 A1 10/2013 Lakshman et al.
2013/0262276 A1 10/2013 Wan et al.
2013/0262336 A1 10/2013 Wan et al.
2013/0264381 A1 10/2013 Kim et al.
2013/0320133 A1 12/2013 Ratti et al.
2013/0324164 A1 12/2013 Vulcano
2013/0332062 A1 12/2013 Kreitmair-Steck et al.
2013/0344778 A1 12/2013 Schafer et al.
2014/0010656 A1 1/2014 Nies
2014/0025230 A1 1/2014 Levien et al.
2014/0030444 A1 1/2014 Swaminathan et al.
2014/0031964 A1 1/2014 Sidhu et al.
2014/0032034 A1 1/2014 Raptopoulos et al.
2014/0040065 A1 2/2014 DuBois
2014/0052661 A1 2/2014 Shakes et al.
2014/0058959 A1 2/2014 Isbjornssund et al.
2014/0081445 A1 3/2014 Villamar
2014/0089073 A1 3/2014 Jacobs et al.
2014/0124619 A1 5/2014 McGeer et al.
2014/0124621 A1 5/2014 Godzdanker et al.
2014/0136282 A1 5/2014 Fedele
2014/0136414 A1 5/2014 Abhyanker
2014/0149244 A1 5/2014 Abhyanker
2014/0156053 A1 6/2014 Mahdavi et al.
2014/0180914 A1 6/2014 Abhyanker
2014/0200697 A1 7/2014 Cheng
2014/0214684 A1 7/2014 Pell
2014/0244433 A1 8/2014 Cruz
2014/0254896 A1 9/2014 Zhou et al.
2014/0257595 A1 9/2014 Tillmann
2014/0271200 A1 9/2014 Sutton et al.
2014/0283104 A1 9/2014 Nilsson
2014/0309813 A1 10/2014 Ricci
2014/0319272 A1 10/2014 Casado Magaña et al.
2014/0325218 A1 10/2014 Shimizu et al.
2014/0330456 A1 11/2014 Lopez Morales et al.
2015/0006005 A1 1/2015 Yu et al.
2015/0066178 A1 3/2015 Stava
2015/0069968 A1 3/2015 Pounds
2015/0097530 A1 4/2015 Scarlatti et al.
2015/0098819 A1 4/2015 Tourin et al.
2015/0102154 A1 4/2015 Duncan et al.
2015/0112837 A1 4/2015 O'Dea
2015/0112885 A1 4/2015 Fadell et al.
2015/0120094 A1 4/2015 Kimchi et al.
2015/0120602 A1 4/2015 Huffman et al.
2015/0123462 A1 5/2015 Kamradt et al.
2015/0127712 A1 5/2015 Fadell et al.
2015/0129716 A1 5/2015 Yoffe
2015/0158587 A1 6/2015 Patrick et al.
2015/0158599 A1 6/2015 Sisko
2015/0175276 A1 6/2015 Koster
2015/0183528 A1 7/2015 Walsh et al.
2015/0185034 A1 7/2015 Abhyanker
2015/0191255 A1 7/2015 Zolich et al.

(56) References Cited

U.S. PATENT DOCUMENTS

| | | | |
|---|---|---|---|
| 2015/0202770 | A1 | 7/2015 | Patron et al. |
| 2015/0217860 | A1 | 8/2015 | Yang |
| 2015/0227882 | A1 | 8/2015 | Bhatt |
| 2015/0246727 | A1 | 9/2015 | Masticola et al. |
| 2015/0253777 | A1 | 9/2015 | Binney et al. |
| 2015/0254611 | A1 | 9/2015 | Perez |
| 2015/0259078 | A1 | 9/2015 | Filipovic et al. |
| 2015/0286216 | A1 | 10/2015 | Miwa |
| 2015/0314881 | A1 | 11/2015 | Tsaliah et al. |
| 2015/0317597 | A1 | 11/2015 | Shucker et al. |
| 2015/0332206 | A1 | 11/2015 | Trew et al. |
| 2015/0336669 | A1 | 11/2015 | Kantor et al. |
| 2015/0336670 | A1 | 11/2015 | Zhang |
| 2015/0336677 | A1 | 11/2015 | Smaoui et al. |
| 2015/0363843 | A1 | 12/2015 | Loppatto et al. |
| 2015/0367850 | A1 | 12/2015 | Clarke et al. |
| 2015/0370251 | A1 | 12/2015 | Siegel et al. |
| 2016/0001877 | A1 | 1/2016 | Paulos |
| 2016/0001883 | A1 | 1/2016 | Sanz et al. |
| 2016/0003637 | A1 | 1/2016 | Andersen |
| 2016/0009413 | A1 | 1/2016 | Lee et al. |
| 2016/0011592 | A1 | 1/2016 | Zhang et al. |
| 2016/0019495 | A1 | 1/2016 | Kolchin |
| 2016/0023761 | A1 | 1/2016 | McNally |
| 2016/0033966 | A1 | 2/2016 | Farris et al. |
| 2016/0039541 | A1 | 2/2016 | Beardsley et al. |
| 2016/0051110 | A1 | 2/2016 | Cao et al. |
| 2016/0058181 | A1 | 3/2016 | Han et al. |
| 2016/0068264 | A1 | 3/2016 | Ganesh et al. |
| 2016/0068265 | A1 | 3/2016 | Hoareau et al. |
| 2016/0068267 | A1 | 3/2016 | Liu et al. |
| 2016/0070265 | A1 | 3/2016 | Liu et al. |
| 2016/0085238 | A1 | 3/2016 | Hayes |
| 2016/0101856 | A1 | 4/2016 | Kohstall |
| 2016/0104099 | A1 | 4/2016 | Villamar |
| 2016/0104113 | A1 | 4/2016 | Gorlin |
| 2016/0107750 | A1 | 4/2016 | Yates |
| 2016/0114488 | A1 | 4/2016 | Mascorro Medina et al. |
| 2016/0117931 | A1 | 4/2016 | Chan et al. |
| 2016/0125746 | A1 | 5/2016 | Kunzi et al. |
| 2016/0129592 | A1 | 5/2016 | Saboo et al. |
| 2016/0130000 | A1 | 5/2016 | Rimanelli |
| 2016/0130015 | A1 | 5/2016 | Caubel et al. |
| 2016/0131025 | A1 | 5/2016 | Pekrul |
| 2016/0132059 | A1 | 5/2016 | Mason et al. |
| 2016/0144734 | A1 | 5/2016 | Wang et al. |
| 2016/0144982 | A1 | 5/2016 | Sugumaran |
| 2016/0180618 | A1 | 6/2016 | Ho et al. |
| 2016/0185466 | A1 | 6/2016 | Dreano |
| 2016/0194959 | A1 | 7/2016 | Pekrul |
| 2016/0196755 | A1 | 7/2016 | Navot et al. |
| 2016/0196756 | A1 | 7/2016 | Prakash et al. |
| 2016/0200438 | A1 | 7/2016 | Bokeno et al. |
| 2016/0207627 | A1 | 7/2016 | Hoareau et al. |
| 2016/0214717 | A1 | 7/2016 | De Silva |
| 2016/0214728 | A1 | 7/2016 | Rossi et al. |
| 2016/0221671 | A1 | 8/2016 | Van Niekerk et al. |
| 2016/0229299 | A1 | 8/2016 | Streett |
| 2016/0229530 | A1 | 8/2016 | Welsh et al. |
| 2016/0235236 | A1 | 8/2016 | Byers et al. |
| 2016/0239789 | A1 | 8/2016 | Hanks |
| 2016/0239803 | A1 | 8/2016 | Borley et al. |
| 2016/0244162 | A1 | 8/2016 | Weller |
| 2016/0244187 | A1 | 8/2016 | Byers et al. |
| 2016/0257401 | A1 | 9/2016 | Buchmueller et al. |
| 2016/0257423 | A1 | 9/2016 | Martin |
| 2016/0257424 | A1 | 9/2016 | Stabler et al. |
| 2016/0257426 | A1 | 9/2016 | Mozer |
| 2016/0258775 | A1 | 9/2016 | Santilli et al. |
| 2016/0266578 | A1 | 9/2016 | Douglas et al. |
| 2016/0272317 | A1 | 9/2016 | Cho et al. |
| 2016/0280371 | A1 | 9/2016 | Canavor et al. |
| 2016/0282126 | A1 | 9/2016 | Watts et al. |
| 2016/0286128 | A1 | 9/2016 | Zhou |
| 2016/0291445 | A1 | 10/2016 | Fisher et al. |
| 2016/0299233 | A1 | 10/2016 | Levien et al. |
| 2016/0304198 | A1 | 10/2016 | Jourdan |
| 2016/0304217 | A1 | 10/2016 | Fisher et al. |
| 2016/0307448 | A1 | 10/2016 | Salnikov et al. |
| 2016/0311329 | A1 | 10/2016 | Rodriguez |
| 2016/0321503 | A1 | 11/2016 | Zhou |
| 2016/0334229 | A1 | 11/2016 | Ross et al. |
| 2016/0340006 | A1 | 11/2016 | Tang |
| 2016/0340021 | A1 | 11/2016 | Zhang et al. |
| 2016/0355261 | A1 | 12/2016 | Chin et al. |
| 2016/0364660 | A1 | 12/2016 | Brown |
| 2016/0364679 | A1 | 12/2016 | Cao |
| 2016/0364823 | A1 | 12/2016 | Cao |
| 2016/0364989 | A1 | 12/2016 | Speasl et al. |
| 2016/0371984 | A1 | 12/2016 | Macfarlane et al. |
| 2016/0378108 | A1 | 12/2016 | Paczan et al. |
| 2017/0011333 | A1 | 1/2017 | Greiner et al. |
| 2017/0011340 | A1 | 1/2017 | Gabbai |
| 2017/0015415 | A1 | 1/2017 | Chan et al. |
| 2017/0021923 | A1 | 1/2017 | Fisher et al. |
| 2017/0021941 | A1 | 1/2017 | Fisher et al. |
| 2017/0021942 | A1 | 1/2017 | Fisher et al. |
| 2017/0023949 | A1 | 1/2017 | Fisher et al. |
| 2017/0032315 | A1 | 2/2017 | Gupta et al. |
| 2017/0050749 | A1 | 2/2017 | Pilskalns |
| 2017/0073085 | A1 | 3/2017 | Tremblay et al. |
| 2017/0081043 | A1 | 3/2017 | Jones et al. |
| 2017/0087999 | A1 | 3/2017 | Miller et al. |
| 2017/0096222 | A1 | 4/2017 | Spinelli et al. |
| 2017/0100837 | A1 | 4/2017 | Zevenbergen et al. |
| 2017/0113352 | A1 | 4/2017 | Lutz et al. |
| 2017/0117676 | A1 | 4/2017 | James et al. |
| 2017/0121023 | A1 | 5/2017 | High et al. |
| 2017/0129464 | A1 | 5/2017 | Wang et al. |
| 2017/0129603 | A1 | 5/2017 | Raptopoulos et al. |
| 2017/0132558 | A1 | 5/2017 | Perez |
| 2017/0137118 | A1 | 5/2017 | Gentry |
| 2017/0137150 | A1 | 5/2017 | Conyers et al. |
| 2017/0144776 | A1 | 5/2017 | Fisher et al. |
| 2017/0147975 | A1 | 5/2017 | Natarajan et al. |
| 2017/0152060 | A1 | 6/2017 | Morisawa |
| 2017/0154347 | A1 | 6/2017 | Bateman |
| 2017/0158352 | A1 | 6/2017 | von Flotow et al. |
| 2017/0158353 | A1 | 6/2017 | Schmick |
| 2017/0166327 | A1 | 6/2017 | Schmidt |
| 2017/0167881 | A1 | 6/2017 | Rander et al. |
| 2017/0174335 | A1 | 6/2017 | Malloy |
| 2017/0190443 | A1 | 7/2017 | Fisher et al. |
| 2017/0193442 | A1 | 7/2017 | Ekkel et al. |
| 2017/0197725 | A1 | 7/2017 | Foo et al. |
| 2017/0199522 | A1 | 7/2017 | Li |
| 2017/0203632 | A1 | 7/2017 | Westendarp et al. |
| 2017/0203857 | A1 | 7/2017 | O'Toole |
| 2017/0225782 | A1 | 8/2017 | Kohstall et al. |
| 2017/0225783 | A1 | 8/2017 | Niekerk et al. |
| 2017/0225799 | A1 | 8/2017 | Selwyn et al. |
| 2017/0225801 | A1 | 8/2017 | Bennett |
| 2017/0225802 | A1 | 8/2017 | Lussier et al. |
| 2017/0240291 | A1 | 8/2017 | Kim |
| 2017/0247120 | A1 | 8/2017 | Miller |
| 2017/0253349 | A1 | 9/2017 | Wang et al. |
| 2017/0255896 | A1 | 9/2017 | Van Dyke |
| 2017/0270314 | A1 | 9/2017 | Tsybrovskyy et al. |
| 2017/0275025 | A1 | 9/2017 | Johnson et al. |
| 2017/0283090 | A1 | 10/2017 | Miller et al. |
| 2017/0286905 | A1 | 10/2017 | Richardson et al. |
| 2017/0300855 | A1 | 10/2017 | Lund et al. |
| 2017/0305526 | A1 | 10/2017 | Thomassey |
| 2017/0305575 | A1 | 10/2017 | Bash et al. |
| 2017/0308850 | A1 | 10/2017 | Roush et al. |
| 2017/0313421 | A1 | 11/2017 | Gil |
| 2017/0316379 | A1 | 11/2017 | Lepek et al. |
| 2017/0316701 | A1 | 11/2017 | Gil et al. |
| 2017/0323129 | A1 | 11/2017 | Davidson et al. |
| 2017/0327091 | A1 | 11/2017 | Capizzo |
| 2017/0330145 | A1 | 11/2017 | Studnicka |
| 2017/0341769 | A1 | 11/2017 | Haberbusch et al. |
| 2017/0345245 | A1 | 11/2017 | Torresani et al. |
| 2017/0372256 | A1 | 12/2017 | Kantor et al. |

(56) References Cited

U.S. PATENT DOCUMENTS

2018/0024554 A1 1/2018 Brady et al.
2018/0029723 A1 2/2018 Krauss et al.
2018/0039286 A1 2/2018 Tirpak et al.
2018/0053139 A1 2/2018 Stoman
2018/0056794 A1 3/2018 Kim et al.
2018/0088586 A1 3/2018 Hance et al.
2018/0092345 A1 4/2018 Okumura
2018/0092484 A1 4/2018 Lewis et al.
2018/0105020 A1 4/2018 Smith et al.
2018/0105271 A1 4/2018 Wypyszynski et al.
2018/0105289 A1 4/2018 Walsh et al.
2018/0118340 A1 5/2018 Russo
2018/0118374 A1 5/2018 Lombardini et al.
2018/0127211 A1 5/2018 Jarvis et al.
2018/0137454 A1 5/2018 Kulkarni et al.
2018/0141682 A1 5/2018 Blake et al.
2018/0148170 A1 5/2018 Stamatovski
2018/0194484 A1 7/2018 Livieratos et al.
2018/0196418 A1 7/2018 Meier et al.
2018/0208070 A1 7/2018 Sanchez et al.
2018/0233055 A1 8/2018 Damnjanovic et al.
2018/0237161 A1 8/2018 Minnick et al.
2018/0245365 A1 8/2018 Wankewycz
2018/0257775 A1 9/2018 Baek et al.
2018/0265196 A1 9/2018 Phillips et al.
2018/0265295 A1 9/2018 Beckman et al.
2018/0265296 A1 9/2018 Beckman et al.
2018/0295327 A1 10/2018 Yearwood
2018/0312276 A1 11/2018 Miller et al.
2018/0319496 A1 11/2018 Zhang et al.
2018/0327091 A1 11/2018 Burks et al.
2018/0354649 A1 12/2018 Ortiz et al.
2018/0357910 A1 12/2018 Hobbs et al.
2018/0360326 A1 12/2018 Lee et al.
2018/0364740 A1 12/2018 Collins et al.
2018/0370618 A1 12/2018 Harris
2018/0370652 A1 12/2018 Vendrame et al.
2019/0002128 A1* 1/2019 Raz ........................ B60L 53/16
2019/0009926 A1 1/2019 Hu
2019/0016476 A1 1/2019 Scherz
2019/0023133 A1 1/2019 Renold et al.
2019/0023416 A1 1/2019 Borko et al.
2019/0028904 A1 1/2019 Carpenter et al.
2019/0047462 A1 2/2019 Vijayaraghavan et al.
2019/0051192 A1 2/2019 Schick et al.
2019/0055018 A1 2/2019 Bei et al.
2019/0100108 A1 4/2019 Davis et al.
2019/0100313 A1 4/2019 Campbell
2019/0100330 A1 4/2019 Cheng et al.
2019/0106224 A1 4/2019 Nishikawa et al.
2019/0108472 A1 4/2019 Sweeney et al.
2019/0135403 A1 5/2019 Perry et al.
2019/0152326 A1 5/2019 Nishikawa
2019/0161190 A1 5/2019 Gil et al.
2019/0172358 A1 6/2019 Zhou et al.
2019/0193952 A1 6/2019 Zevenbergen et al.
2019/0217952 A1 7/2019 Zawadzki et al.
2019/0217968 A1 7/2019 Schmidt
2019/0233103 A1 8/2019 High et al.
2019/0233107 A1 8/2019 Tian
2019/0245365 A1 8/2019 Farrahi Moghaddam et al.
2019/0256201 A1 8/2019 Plekhanov
2019/0256202 A1 8/2019 Resnick
2019/0256207 A1 8/2019 Nohmi et al.
2019/0258910 A1 8/2019 Stoman
2019/0263519 A1 8/2019 Argus
2019/0270526 A1* 9/2019 Hehn ..................... H02J 7/731
2019/0283871 A1 9/2019 Wieczorek
2019/0291961 A1 9/2019 Urban
2019/0308724 A1 10/2019 Cooper et al.
2019/0315235 A1 10/2019 Kung
2019/0315463 A1 10/2019 Chen et al.
2019/0337407 A1 11/2019 Wang
2019/0348862 A1 11/2019 Obayashi
2019/0375504 A1 12/2019 Schmalzried et al.
2019/0382134 A1 12/2019 Baklycki
2019/0383052 A1 12/2019 Blake et al.
2020/0003529 A1 1/2020 Benezra
2020/0010214 A1 1/2020 Newcomb
2020/0017218 A1 1/2020 Ahmad et al.
2020/0017237 A1 1/2020 Walker
2020/0031466 A1 1/2020 Anderson
2020/0036243 A1 1/2020 Zhao
2020/0044463 A1 2/2020 Kim et al.
2020/0055613 A1 2/2020 Miller et al.
2020/0062373 A1 2/2020 Liao
2020/0094957 A1 3/2020 Sohmshetty et al.
2020/0108930 A1 4/2020 Foley
2020/0113167 A1 4/2020 Bouten
2020/0148322 A1 5/2020 Pekrul
2020/0165008 A1 5/2020 Krauss et al.
2020/0180940 A1 6/2020 Rainville
2020/0189731 A1 6/2020 Mistry et al.
2020/0198803 A1 6/2020 Zhou
2020/0207484 A1 7/2020 Foggia et al.
2020/0207485 A1 7/2020 Foggia et al.
2020/0218287 A1 7/2020 Wang et al.
2020/0218288 A1 7/2020 Johnson et al.
2020/0225684 A1 7/2020 Anderson et al.
2020/0231054 A1 7/2020 Resnick
2020/0239160 A1 7/2020 Cheng et al.
2020/0247540 A1 8/2020 Jones et al.
2020/0262583 A1 8/2020 Ducharme et al.
2020/0272144 A1 8/2020 Yang et al.
2020/0284883 A1 9/2020 Ferreira et al.
2020/0290752 A1 9/2020 Kolosiuk
2020/0301445 A1 9/2020 Jourdan et al.
2020/0307829 A1 10/2020 Smith et al.
2020/0309489 A1 10/2020 Kadavanich et al.
2020/0310465 A1 10/2020 Carthew et al.
2020/0324898 A1 10/2020 Youmans et al.
2020/0346736 A1 11/2020 Krasnoff
2020/0346743 A1 11/2020 Bernard
2020/0349852 A1 11/2020 DiCosola
2020/0369384 A1 11/2020 Kelly
2020/0369408 A1 11/2020 Dolata et al.
2020/0398999 A1 12/2020 Ortiz et al.
2020/0406773 A1 12/2020 Lacaze et al.
2021/0016696 A1 1/2021 Kelly et al.
2021/0031947 A1 2/2021 Wankewycz et al.
2021/0045564 A1 2/2021 Duckers et al.
2021/0047055 A1 2/2021 Lee et al.
2021/0053677 A1 2/2021 Passley
2021/0070468 A1 3/2021 Svirsky et al.
2021/0074170 A1 3/2021 Barker et al.
2021/0086913 A1 3/2021 Friedman et al.
2021/0089055 A1 3/2021 Tran
2021/0094686 A1 4/2021 Metzner et al.
2021/0107682 A1 4/2021 Kozlenko et al.
2021/0107684 A1 4/2021 Le Lann
2021/0114729 A1 4/2021 Ragan et al.
2021/0122495 A1 4/2021 Rezvani et al.
2021/0125503 A1 4/2021 Henry et al.
2021/0127658 A1 5/2021 Luebke et al.
2021/0197983 A1 7/2021 Wang et al.
2021/0214068 A1 7/2021 Bry et al.
2021/0214102 A1 7/2021 Geng et al.
2021/0224739 A1 7/2021 Sweeny et al.
2021/0229805 A1 7/2021 Getman
2021/0237694 A1 8/2021 Hirschvogel et al.
2021/0237899 A1 8/2021 Warwick et al.
2021/0253242 A1 8/2021 Falk-Petersen et al.
2021/0276735 A1 9/2021 Raptopoulos et al.
2021/0284335 A1 9/2021 McLaughlin et al.
2021/0284356 A1 9/2021 Jourdan et al.
2021/0300591 A1* 9/2021 Tian ........................ B64F 1/007
2021/0309388 A1 10/2021 Ratajczak et al.
2021/0339842 A1 11/2021 Sauer
2021/0347500 A1 11/2021 Hagan
2021/0349456 A1 11/2021 Pham et al.
2021/0354820 A1 11/2021 Hiller
2021/0371128 A1 12/2021 Rodriguez et al.
2021/0394930 A1 12/2021 O'Toole
2021/0405655 A1 12/2021 Yi et al.

(56) References Cited

U.S. PATENT DOCUMENTS

| | | | |
|---|---|---|---|
| 2022/0009647 | A1 | 1/2022 | Johannesson et al. |
| 2022/0019247 | A1 | 1/2022 | Dayan et al. |
| 2022/0024577 | A1 | 1/2022 | Stamatovski |
| 2022/0041279 | A1 | 2/2022 | Rowse et al. |
| 2022/0041299 | A1 | 2/2022 | Wankewycz et al. |
| 2022/0055745 | A1 | 2/2022 | Walker et al. |
| 2022/0055770 | A1 | 2/2022 | O'Toole |
| 2022/0063798 | A1 | 3/2022 | Johnson |
| 2022/0073214 | A1 | 3/2022 | Liske et al. |
| 2022/0106125 | A1 | 4/2022 | Ragan et al. |
| 2022/0119105 | A1 | 4/2022 | Schmalzried et al. |
| 2022/0162001 | A1 | 5/2022 | Gherardi et al. |
| 2022/0163980 | A1 | 5/2022 | Beer et al. |
| 2022/0169400 | A1 | 6/2022 | Seeley |
| 2022/0169401 | A1 | 6/2022 | Di Cosola |
| 2022/0171388 | A1 | 6/2022 | Yanagihashi et al. |
| 2022/0177124 | A1 | 6/2022 | Marshall et al. |
| 2022/0177125 | A1 | 6/2022 | Abdellatif et al. |
| 2022/0185501 | A1 | 6/2022 | Kempley |
| 2022/0234757 | A1 | 7/2022 | Dayan et al. |
| 2022/0242589 | A1 | 8/2022 | Pham et al. |
| 2022/0289376 | A1 | 9/2022 | Hayakawa |
| 2022/0306320 | A1 | 9/2022 | Howe et al. |
| 2022/0315248 | A1 | 10/2022 | Castellano Aldave et al. |
| 2022/0380063 | A1 | 12/2022 | Shah et al. |
| 2022/0396373 | A1 | 12/2022 | Wang et al. |
| 2022/0396421 | A1 | 12/2022 | Tian |
| 2023/0017530 | A1 | 1/2023 | Lowe et al. |
| 2023/0023246 | A1 | 1/2023 | McLaughlin et al. |
| 2023/0031028 | A1 | 2/2023 | Ehasoo et al. |
| 2023/0044050 | A1 | 2/2023 | Cevacins et al. |
| 2023/0045483 | A1 | 2/2023 | Ahn |
| 2023/0045691 | A1 | 2/2023 | Cevacins et al. |
| 2023/0046127 | A1 | 2/2023 | Guerra Johansson |
| 2023/0063715 | A1 | 3/2023 | Bell |
| 2023/0065140 | A1 | 3/2023 | Blevins et al. |
| 2023/0074715 | A1 | 3/2023 | Kwon |
| 2023/0088830 | A1 | 3/2023 | Kim |
| 2023/0096139 | A1 | 3/2023 | Ubaldi |
| 2023/0100169 | A1 | 3/2023 | Walsh et al. |
| 2023/0131957 | A1 | 4/2023 | Lowenberg et al. |
| 2023/0133068 | A1 | 5/2023 | Wiegman |
| 2023/0140387 | A1 | 5/2023 | Infanti et al. |
| 2023/0159192 | A1 | 5/2023 | Gil et al. |
| 2023/0202680 | A1 | 6/2023 | Yehya |
| 2023/0202682 | A1 | 6/2023 | Kiyokami et al. |
| 2023/0202691 | A1 | 6/2023 | Kiyokami et al. |
| 2023/0244249 | A1 | 8/2023 | Smith et al. |
| 2023/0249851 | A1 | 8/2023 | Tian |
| 2023/0257139 | A1 | 8/2023 | Straus et al. |
| 2023/0298268 | A1 | 9/2023 | Oleynikova et al. |
| 2023/0303272 | A1 | 9/2023 | Passley |
| 2023/0347765 | A1 | 11/2023 | Lowe et al. |
| 2023/0348099 | A1 | 11/2023 | Woo et al. |
| 2023/0348100 | A1 | 11/2023 | Altenhofen et al. |
| 2023/0348103 | A1 | 11/2023 | Lowe et al. |
| 2023/0348104 | A1 | 11/2023 | Lowe et al. |
| 2023/0348105 | A1 | 11/2023 | Grasberger et al. |
| 2023/0348106 | A1 | 11/2023 | Berthelet et al. |
| 2023/0348122 | A1 | 11/2023 | Fehler et al. |
| 2023/0349146 | A1 | 11/2023 | Vasconi |
| 2023/0373626 | A1 | 11/2023 | Kiyokami |
| 2023/0373668 | A1 | 11/2023 | Kozlenko et al. |
| 2023/0399132 | A1 | 12/2023 | Kiyokami et al. |
| 2024/0002080 | A1 | 1/2024 | Shi et al. |
| 2024/0010368 | A1 | 1/2024 | Liao et al. |
| 2024/0067371 | A1 | 2/2024 | Turner et al. |
| 2024/0076067 | A1 | 3/2024 | Takahashi et al. |
| 2024/0076072 | A1 | 3/2024 | Arii et al. |
| 2024/0101286 | A1 | 3/2024 | Regev |
| 2024/0101287 | A1 | 3/2024 | Takahashi et al. |
| 2024/0101288 | A1 | 3/2024 | Takahashi et al. |
| 2024/0109656 | A1 | 4/2024 | Stege |
| 2024/0111310 | A1 | 4/2024 | Ehasoo et al. |
| 2024/0132238 | A1* | 4/2024 | Qiu ........................ B64U 70/92 |
| 2024/0140228 | A1 | 5/2024 | Lowe et al. |
| 2024/0140630 | A1 | 5/2024 | Lee et al. |
| 2024/0158112 | A1 | 5/2024 | Le Lann |
| 2024/0176367 | A1 | 5/2024 | Zhou et al. |
| 2024/0190593 | A1 | 6/2024 | Shah et al. |
| 2024/0239531 | A1 | 7/2024 | Bitar |
| 2024/0239533 | A1 | 7/2024 | Li et al. |
| 2024/0262545 | A1 | 8/2024 | Fu |
| 2024/0278946 | A1 | 8/2024 | Roberts |
| 2024/0300677 | A1 | 9/2024 | Sercel et al. |
| 2024/0329664 | A1 | 10/2024 | Randolph et al. |
| 2024/0336378 | A1 | 10/2024 | Neate et al. |
| 2024/0343426 | A1 | 10/2024 | Cornew et al. |
| 2024/0384587 | A1 | 11/2024 | Anderson et al. |
| 2024/0391616 | A1 | 11/2024 | Dayan et al. |
| 2024/0425199 | A1 | 12/2024 | Li et al. |
| 2025/0002185 | A1 | 1/2025 | Liu |
| 2025/0026509 | A1 | 1/2025 | Infanti et al. |
| 2025/0074632 | A1 | 3/2025 | DiCosola |
| 2025/0108935 | A1 | 4/2025 | Johnson |
| 2025/0108943 | A1 | 4/2025 | Sekiguchi et al. |
| 2025/0121966 | A1 | 4/2025 | Gronstedt et al. |
| 2025/0128638 | A1 | 4/2025 | Scheler et al. |
| 2025/0145314 | A1 | 5/2025 | Gronstedt et al. |
| 2025/0206463 | A1 | 6/2025 | Aralis et al. |
| 2025/0223061 | A1 | 7/2025 | Merdin et al. |
| 2025/0250006 | A1 | 8/2025 | Burgess et al. |
| 2026/0048863 | A1 | 2/2026 | Turvey et al. |
| 2026/0048878 | A1 | 2/2026 | Turvey et al. |
| 2026/0131903 | A1 | 5/2026 | Pawelczyk et al. |

* cited by examiner

BASE STATIONS FOR UNMANNED AERIAL VEHICLES AND STANDS FOR USE THEREWITH

CROSS-REFERENCE TO RELATED APPLICATION(S)

This application claims priority to and the benefit of U.S. Provisional Patent Application Ser. No. 63/683,520, filed Aug. 15, 2024, the entire contents of which are incorporated by reference herein for all purposes.

TECHNICAL FIELD

The present disclosure relates to a base station for an unmanned aerial vehicle (UAV) and, more specifically, to drainage of the base station.

BACKGROUND

A base station for a UAV is designed to house and protect the UAV when not in use. The base station may often include a landing platform on which the UAV may take flight and land. For example, the base station may include one or more fiducial markings that may be detected by an image sensor (e.g., a camera) of the UAV. Based upon detection of the one or more fiducial markings, the UAV may execute a landing procedure to safely land on the landing platform of the base station. Additionally, the base station may include an integrated charging system so that, when the UAV is not in use and stored on the landing platform, the integrated charging system may replenish a power supply of the UAV (e.g., a battery of the UAV).

SUMMARY

In one aspect of the present disclosure, a docking system for a UAV is disclosed that includes a base station and a stand that is configured to support the base station.

The base station includes a roof assembly and a base that supports the roof assembly.

The base includes: a body; a landing platform that is supported by the body; a temperature control system that is positioned within the base and which is configured to thermally condition the base station and the UAV; and a charging hub that is configured for electrical connection to the UAV to facilitate charging thereof.

The landing platform includes: slots; landing areas, which are configured to receive the UAV during docking; and alignment members, which are movable within the slots. The alignment members are configured for engagement with the UAV and are repositionable between extended and retracted positions.

The stand includes: a spreader plate that is configured for engagement with the base station; uprights that extend from the spreader plate; a brace that extends from the uprights; and at least one port that is configured to receive a transmission member to support power and/or data transmission to the base station via the stand.

In some configurations, the base station may further include at least one drain channel to allow for water egress.

In some configurations, the at least one drain channel may direct water away from the slots in the landing platform.

In some configurations, the at least one drain channel may direct water away from the temperature control system.

In some configurations, the at least one drain channel may direct water away from the charging hub.

In some configurations, the at least one drain channel may direct water away from a user panel.

In some configurations, the at least one drain channel may direct water away from an intake vent.

In some configurations, the base station may further include at least one drain heater that is configured to de-ice the at least one drain channel.

In some configurations, the charging hub may be repositionable between a retracted position, in which the charging hub is concealed by the landing platform, and an extended position, in which the charging hub is exposed from the landing platform.

In some configurations, the charging hub may extend through the landing platform in the extended position.

In some configurations, the stand may further include at least one alignment pin that extends outwardly from the spreader plate and which is configured for insertion into the base station.

In some configurations, the uprights may extend along a first axis, and the brace may extend along a second axis.

In some configurations, the stand may be configured such that the first axis and the second axis subtend an angle therebetween that lies substantially within the range of approximately 30 degrees to approximately 75 degrees.

In some configurations, the uprights may include at least one storage compartment.

In some configurations, the brace may include a notch that creates a locking point.

In some configurations, the stand may include at least one mounting point to support permanent installation at a docking site.

In another aspect of the present disclosure, a base station for a UAV is disclosed. The base station includes a base that includes a body defining a cavity therein and a landing platform supported by the body and configured to support the UAV. The base station further includes a roof assembly movably coupled to the base and movable between a closed position, in which the roof assembly is configured to enclose the landing platform, and an open position, in which the landing platform is unobstructed by the roof assembly. The base station also includes a stand having a first leg, a second leg, a frame extending between the first leg and the second leg, and a spreader plate supported by at least one of the first leg and the second leg, whereby the spreader plate is configured to support the base. The stand is configured to support one or more of power transmission and data transmission to the base station via the stand.

In some configurations, the spreader plate may define an upper surface of the stand. A lower surface of the base may abut the upper surface of the spreader plate so that the base is supported by the stand.

In some configurations, the first leg may define a first cavity therein that is accessible through one or more openings defined by the first leg. The second leg may define a second cavity therein that is accessible through one or more openings defined by the second leg. The first cavity may permit routing of wiring through the first leg to connect the wiring to the base station. The second cavity may permit routing of additional wiring through the second leg to connect the additional wiring to the base station. The wiring may be configured to transmit power to the base station via the stand and the additional wiring may be configured to transmit data to the base station via the stand.

In some configurations, the spreader plate may include one or more guide pins that are received by the body of the base to align the base with the stand. The base may be secured to the spreader plate when the base is aligned with the stand.

In some configurations, the frame may be spaced apart from the spreader plate in an elevational direction of the base station. The frame and the spreader plate may extend along planes that are substantially parallel to one another.

In some configurations, the roof assembly may be configured for positioning at least partially between the base and the stand when the roof assembly is in the open position.

In another aspect of the present disclosure, a base station for a UAV is disclosed. The base station includes a base that is configured to support the UAV and a stand coupled to the base and configured to support the base. The stand includes a first leg defining a first cavity therein, a second leg defining a second cavity therein, a frame extending between the first leg and the second leg, and a spreader plate coupled to and supported by the first leg and the second leg. The frame defines a frame cavity therein that is accessible via one or more of the first cavity and the second cavity. The spreader plate is coupled to the base to support the base thereon. Moreover, the spreader plate defines one or more apertures that permit access to one or more of the first cavity of the first leg and the second cavity of the second leg.

In some configurations, wiring may be routable through the stand to connect the wiring to the base by routing the wiring into the frame cavity, through the frame cavity, into the first cavity, and through the first cavity such that the wiring exits the first cavity through the one or more apertures of the spreader plate.

In some configurations, wiring may be routable through the stand to connect the wiring to the base by routing the wiring into the frame cavity, through the frame cavity, into the second cavity, and through the second cavity such that the wiring exits the second cavity through the one or more apertures of the spreader plate.

In some configurations, the spreader plate may define a first aperture that permits access to the first cavity of the first leg and a second aperture that permits access to the second cavity of the second leg.

In some configurations, the first cavity may be accessible via one or more openings defined by the first leg, The one or more openings may be enclosed by one or more access panels.

In some configurations, the second cavity may be accessible via one or more additional openings defined by the second leg. The one or more additional openings may be enclosed by one or more additional access panels.

In some configurations, the frame may define a first opening and a second opening that permit access to the frame cavity. The first opening may be aligned with the first leg such that the frame cavity is accessible through the first opening of the frame from within the first cavity of the first leg. The second opening may be aligned with the second leg such that the frame cavity is accessible through the second opening of the frame from within the second cavity of the second leg.

In another aspect of the present disclosure, a stand for a base station for a UAV is disclosed. The stand includes a first leg defining a first cavity therein, a second leg defining a second cavity therein, a spreader plate coupled to the first leg and the second leg, and a frame extending between the first leg and the second leg. The spreader plate is configured to support the base station, and the frame defines a frame cavity therein. Wiring is routable through one or more of the first cavity, the second cavity, and the frame cavity to transmit one or more of power and data to the base station via the stand. The stand includes counterweighting such that the stand is configured to remain stationary when a roof assembly of the base station moves between a closed position and an open position with respect to the base station.

In some configurations, the first leg and the second leg may extend substantially perpendicular to the frame and the spreader plate.

In some configurations, the first leg may extend along a first axis and the frame may extend along a second axis. An angle between the first axis and the second axis may be within a range of about 30 degrees to about 75 degrees.

In some configurations, the spreader plate may define an upper surface of the stand. The spreader plate may include a pair of guide pins that project away from the spreader plate and are receivable by the base station to align the base station with the stand.

In some configurations, the stand may further include one or more adjustable feet configured to adjust a height of the stand with respect to an elevational direction. The one or more adjustable feet may each include a spindle that is located in the frame cavity and is rotatable to adjust the height of the stand.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
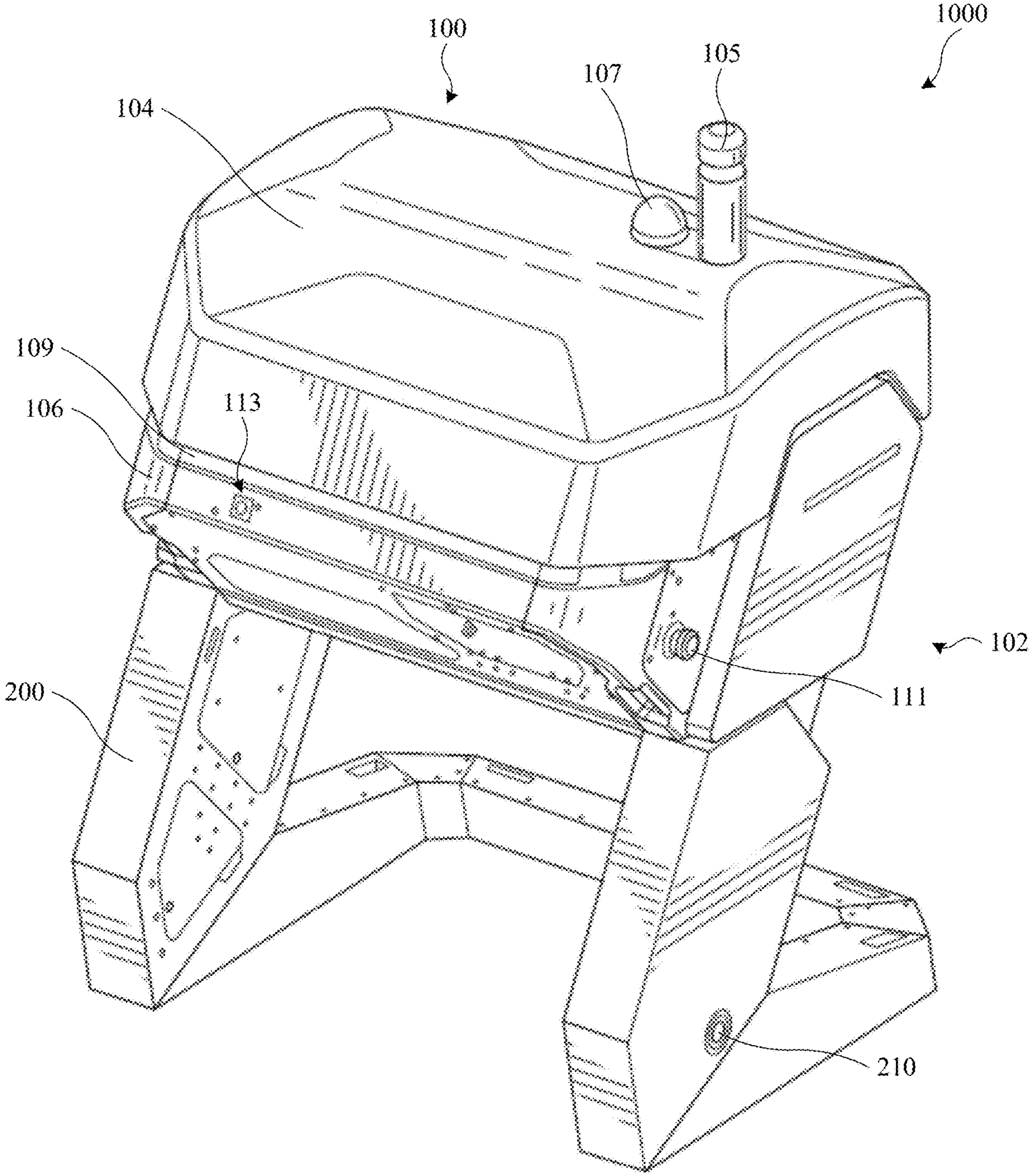
FIG. 1 is a perspective view of a docking system for a UAV.
Figure 2:
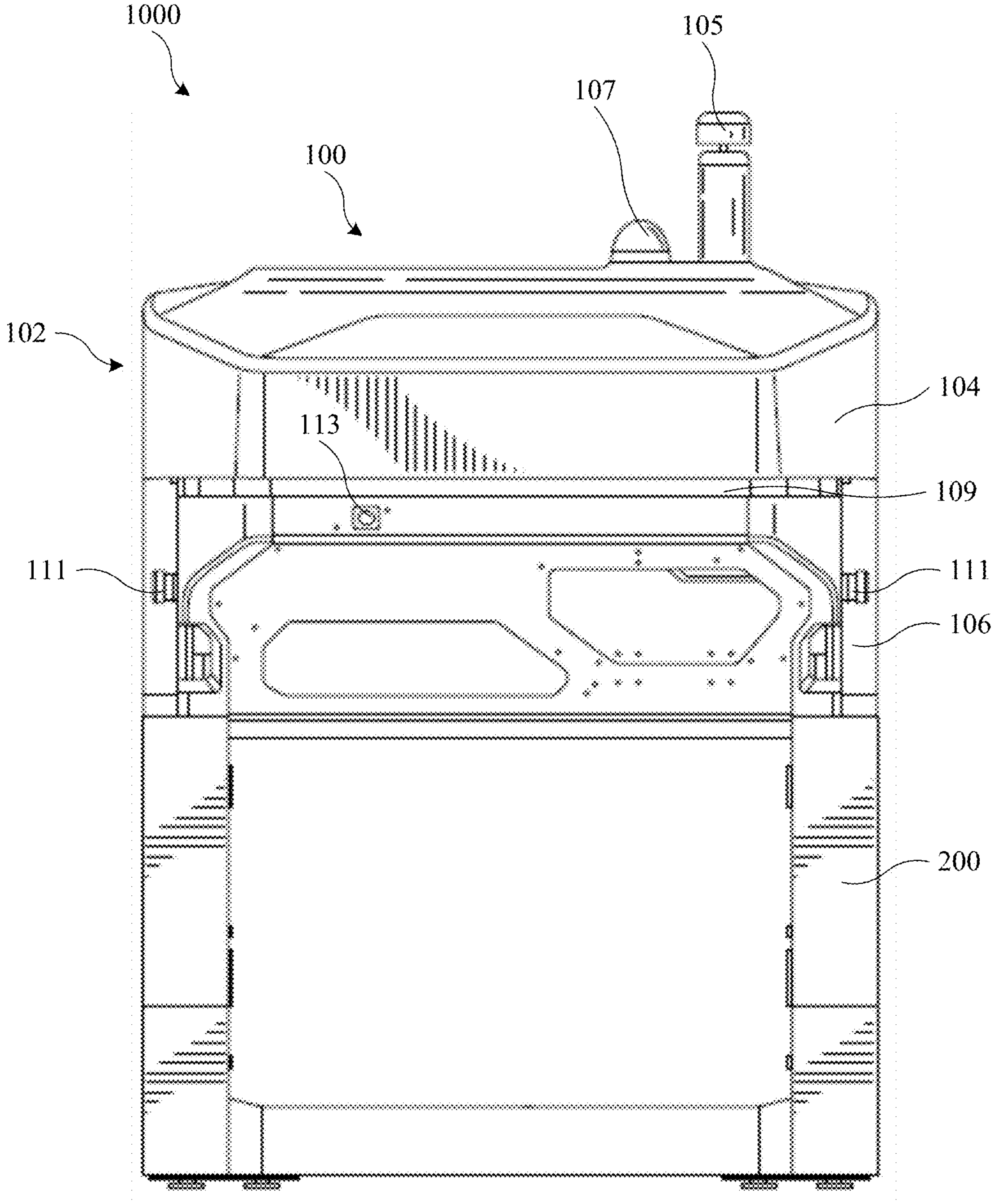
FIG. 2 is a front view of the docking system.

The present disclosure relates to a base station for use with an unmanned aerial vehicle (UAV). The base station may be configured to support the UAV when the UAV is not operating. The base station may be configured to charge a power source (e.g., a battery) of the UAV when the UAV is supported by or contained within the base station. For example, the base station may include a support assembly, such as a landing platform, which may support the UAV during periods of inactivity (e.g., when not in use) and may further support the UAV during takeoff and landing. The landing platform may be positioned within the base station such that, when the UAV is docked (e.g., supported by the landing platform), the base station may contain the UAV.

In an example, the base station may include a base, which may include or be the landing platform, and a roof assembly. The roof assembly may be movable so that, when the UAV is docked, the roof assembly may at least partially enclose the UAV such that the UAV is no longer exposed to environmental conditions, such as precipitation (e.g., rain, snow, hail, etc.), wind, extreme temperatures (e.g., extreme heat and/or cold), sunlight, debris, other external factors, or a combination thereof. Additionally, when the UAV is prepared for takeoff, the roof assembly may be movable so that the landing platform remains unobstructed by the roof assembly and the UAV may safely take off from the landing platform.

Conventional base stations may often be mechanically complex to ensure proper docking of the UAV. Similarly, conventional base stations may frequently require significant operator interaction to ensure proper takeoff and landing of the UAV. For example, the operator may be required to manually move a portion of the base station (e.g., a cover) to ensure that takeoff and landing of the UAV remains unobstructed. Additionally, conventional base stations may often provide a landing surface for the UAV yet provide no protection to the landing surface and/or the UAV once docked. For example, conventional base stations may not include a roof assembly to prevent exposure of one or more of the landing surface, electronics of the base station, or the UAV to various environmental conditions, such as those described above.

The present teachings provide a base station that addresses the aforementioned challenges. The base station herein may advantageously be substantially or entirely automated to substantially alleviate user interaction. The base station herein may also provide protection to the base station and the UAV. For example, the base station may partially or entirely enclose the landing platform to protect the landing platform and the UAV from environmental conditions. Additionally, the base station may include one or more defined drainage paths to ensure that drainage (e.g., water, such as rain, or other fluids, herein referred to as "fluid" or "fluids," which may be inclusive of any fluid, including water, or a combination of fluids) is directed away from components of the base station. For example, the base station may define one or more drainage paths to direct the drainage away from one or more of electronics or a thermal management system of the base station.

Referring now to the drawings, FIGS. 1-4 illustrate a docking system 1000 that includes a base station 100 (e.g., a dock) for a UAV 10 (shown FIGS. 6-8, 10), which is configured for automated servicing (e.g., storage, charging, operation, etc.) and accommodation of the UAV 10, and a stand 200, which is configured to support the base station 100 in an elevated position. While the docking system 1000 and the UAV 10 are shown and described herein, in certain embodiments of the disclosure, it is envisioned that a plurality of docking systems and UAVs may be utilized depending, for example, upon the particular intended use of the UAVs.

The base station 100 includes a base 102 and a roof assembly 104, which is supported by the base 102 such that the roof assembly 104 is repositionable between a closed position, in which the UAV 10 is concealed within the base station 100, and an open position, which facilitates takeoff and landing of the UAV 10. The roof assembly may include, for example, a wind sensor 105, a rain sensor 107, other sensors, or a combination thereof.

Figure 5:
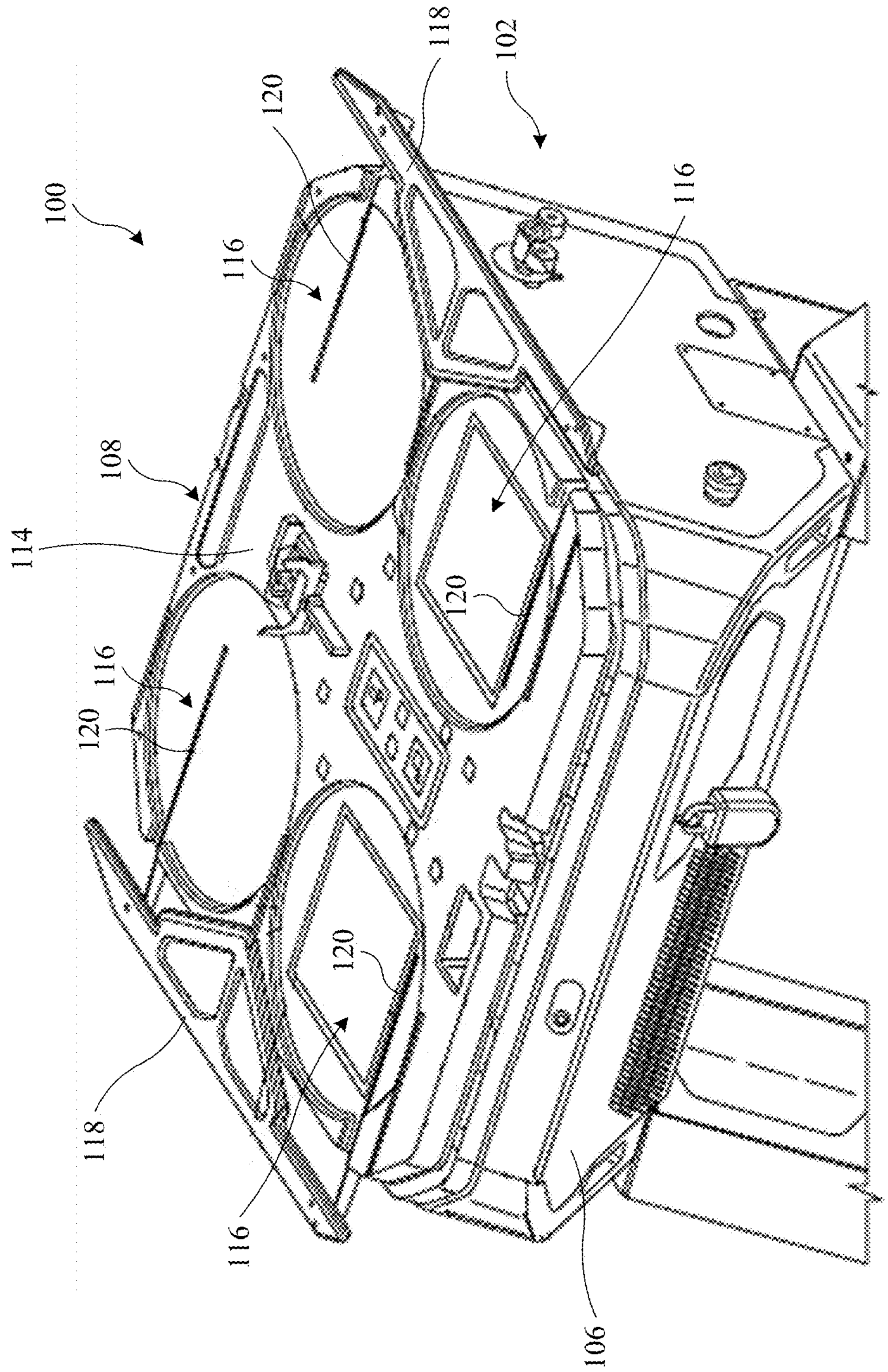
FIG. 5 is a perspective view of the base station illustrating a landing platform of the UAV.
Figure 6:
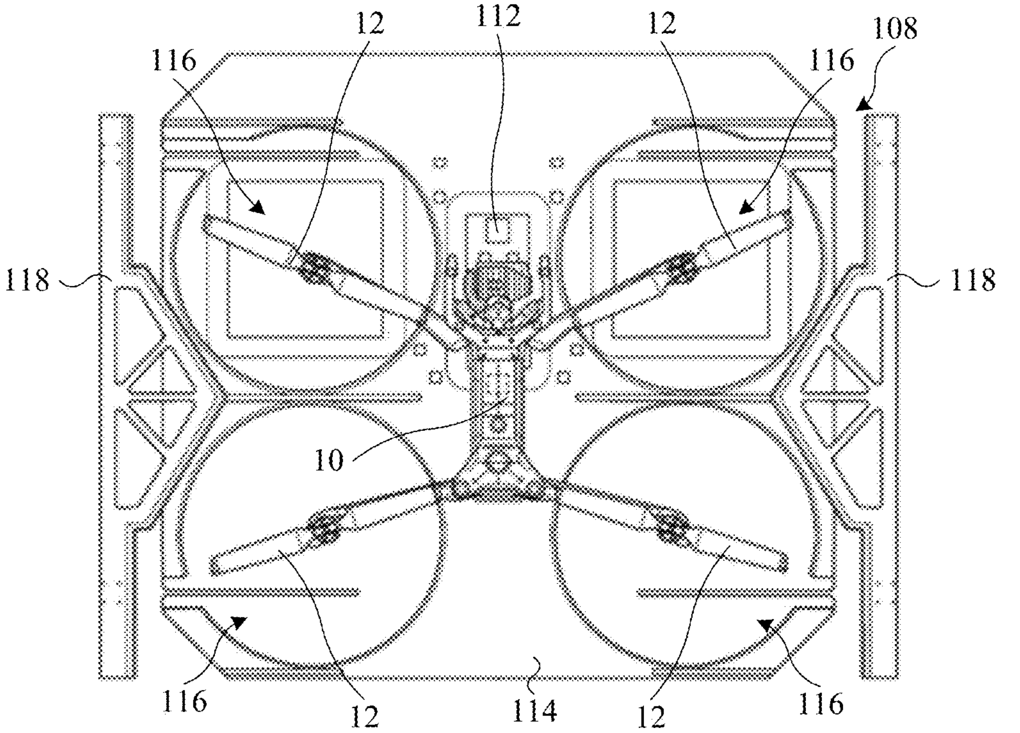
FIG. 6 is a top view of the landing platform with the alignment members shown in extended positions.
Figure 7:
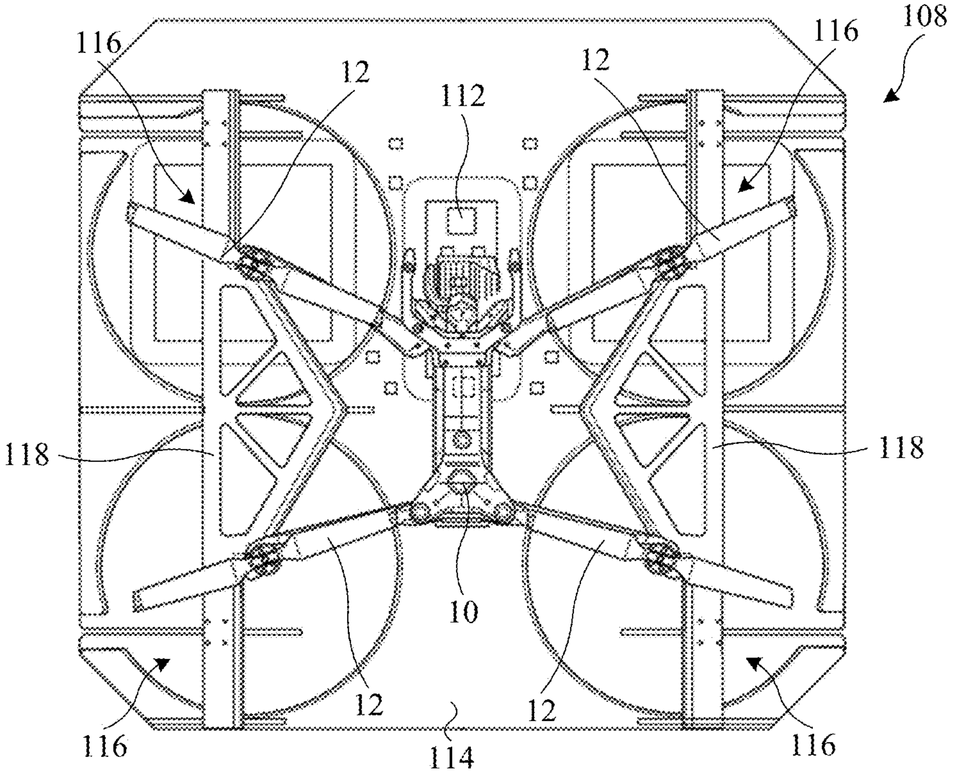
FIG. 7 is a top view of the landing platform with the alignment members shown in retracted positions.
Figure 8:
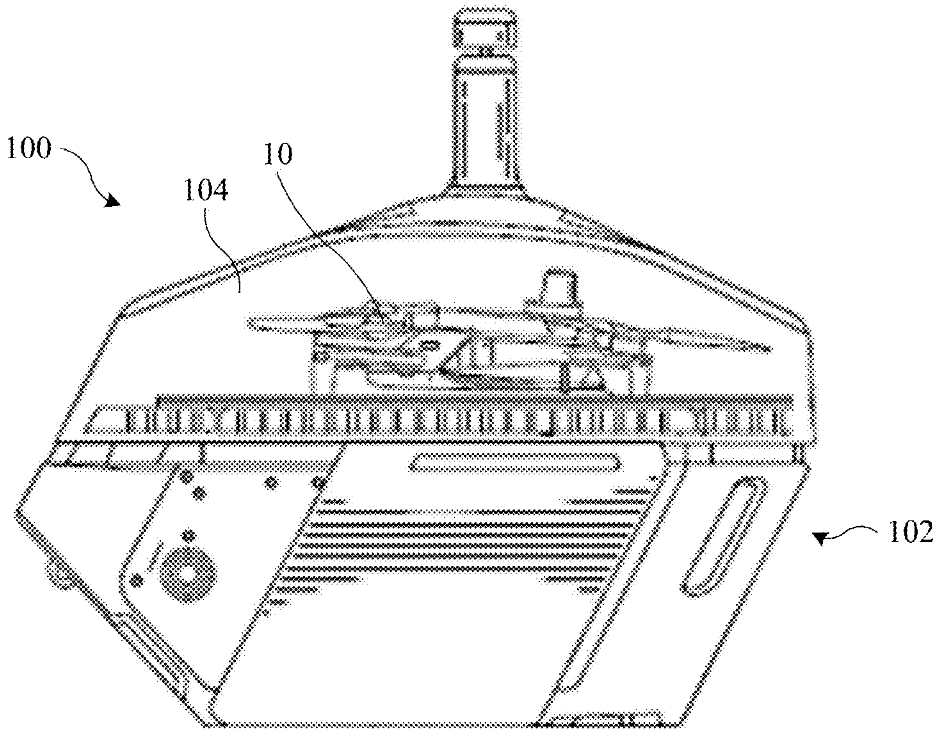
FIG. 8 is a side view of the base station.
Figure 9:
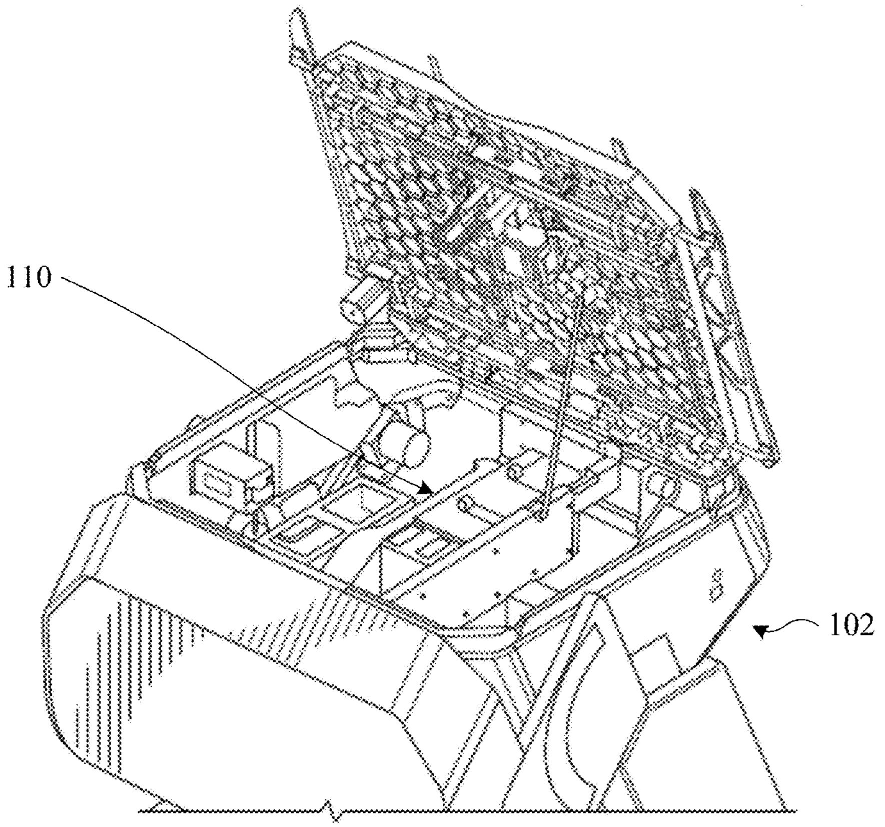
FIG. 9 is a top view of the base station illustrating the temperature control system of the base station.
Figure 10:
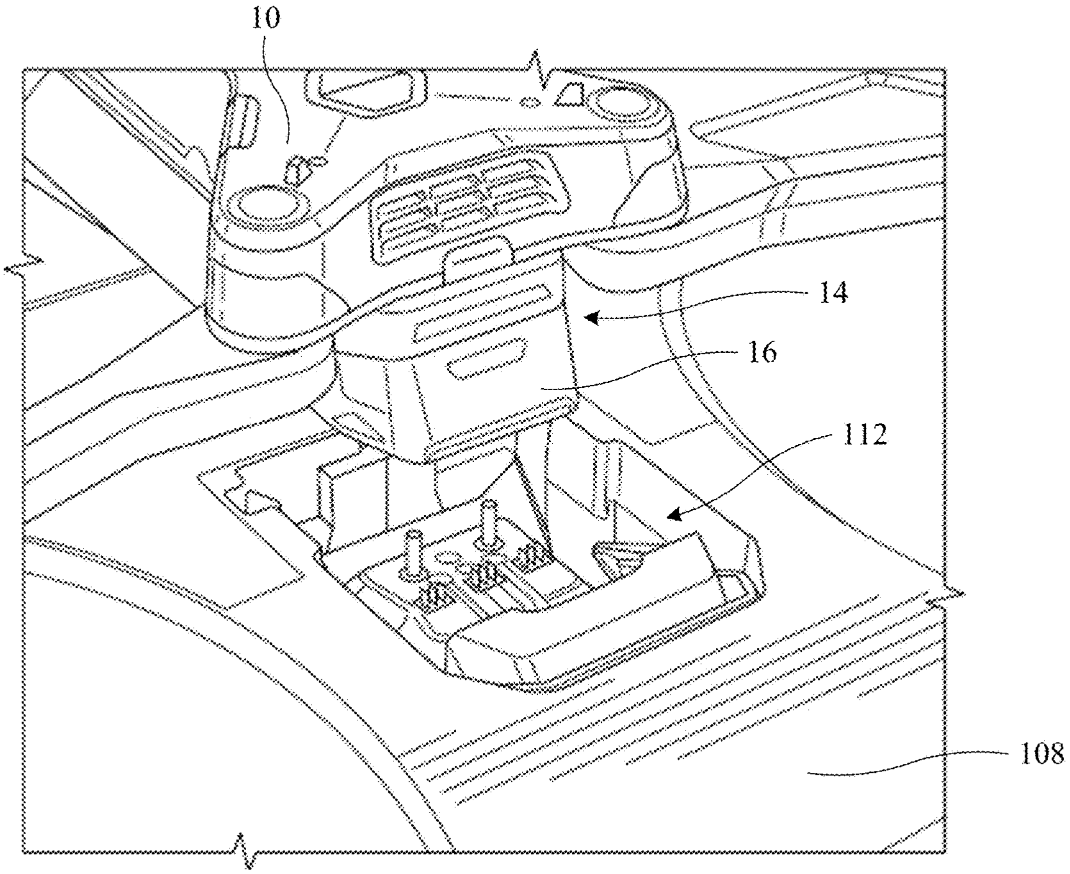
FIG. 10 is a perspective view illustrating connection of the UAV to a charging hub of the base station.

With reference now to FIGS. 5-10 as well, the base 102 includes: a body 106 (e.g., an enclosure), which is the main structural member of the base 102 and supports various internal and external components of the base station 100; a landing platform 108, which is supported by (e.g., connected (secured) to the body 106 and receives the UAV 10 during docking; a temperature control system 110 (e.g., a heating and cooling system, as shown in FIGS. 5 and 9), which is configured to thermally condition (e.g., cool and heat) the base station 100 and the UAV 10 when docked (subject to environmental conditions); a charging hub 112; indicator lighting 109, which may provide a visual indication (e.g., light indication) of operation of the base station 100 and/or the UAV 10; one or more user interfaces (e.g., buttons, switches, capacitive touch sensors, toggles, etc.), such as the user interface 111, which may provide a user control of the base station 100 (e.g., emergency stop button, manual open/close button, etc.); and one or more cameras, such as the camera 113, which may capture images and/or video (e.g., live feed) of an area surrounding the docking system 1000.

The landing platform 108 includes a stage 114 defining landing areas 116 (FIG. 11) and a pair of alignment members 118 (e.g., a first and a second alignment member).

The landing areas 116 receive and constrain the UAV 10 during docking with the base station 100. More specifically, the landing areas 116 receive legs 12 (FIGS. 6, 7) of the UAV 10 and correspond in number thereto.

The alignment members 118 configured for engagement (contact) with the UAV 10 (i.e., the legs 12) and are movable (repositionable) in relation to the stage 114 between extended positions (FIG. 6), in which the alignment members 118 are spaced laterally outward of the landing areas 116 in order to facilitate docking of the UAV 10 with the base station 100, and retracted positions (FIG. 7), in which the alignment members 118 are generally aligned with and are positioned (vertically) above the landing areas 116. More specifically, during repositioning between the extended and retracted positions, the alignment members 118 are movable within slots 120 in the landing platform 108.

The temperature control system 110 (FIGS. 5 and 9) is supported by and positioned (retained, accommodated) within the base 102 and is configured to thermally condition (e.g., cool and heat) the base station 100 and the UAV 10 when docked (subject to environmental conditions). The temperature control system 110 includes: a fan; a filter; a ducting system; (one or more) at least one heat sink in thermal communication with the ducting system; and a thermoelectric conditioner (TEC) in thermal communication with the heat sink(s).

The charging hub 112 (FIGS. 5-7, 10) is configured for engagement (contact) with and electrical connection to a power source 14 (FIG. 10) (i.e., a battery 16) on the UAV 10, which is located (e.g., attached to or otherwise supported on) a lower (bottom) surface thereof, and may draw power from any suitable source, whether internal to the base station 100 or external. The charging hub 112 is repositionable between a retracted position, in which the charging hub 112 is concealed by the landing platform 108, and an extended position, in which the charging hub 112 is exposed from and extends (vertically) through the landing platform 108 to facilitate connection to and charging of the UAV 10.

Figure 11:
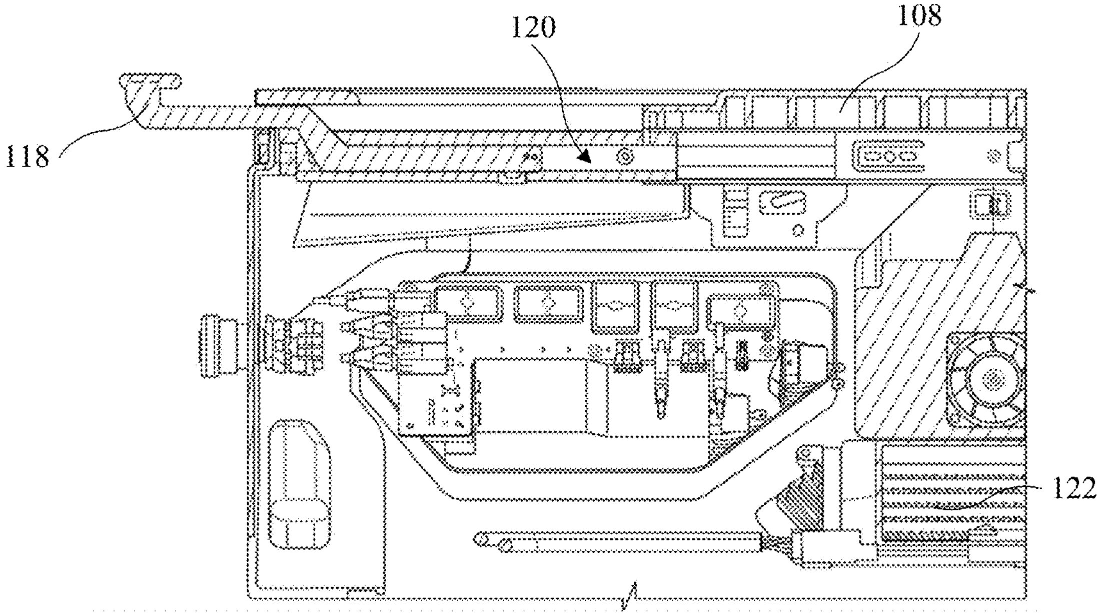
FIG. 11 is a cross-sectional view of the alignment members of the landing platform.

With reference now to FIG. 11 as well, the base station 100 includes (one or more) at least one drain channel (e.g., drain hole(s), path(s), gutter(s), etc.) to allow for fluid (e.g., water) egress during inclement weather and facilitate the evacuation of fluid resulting from condensation, ice melt, etc. For example, the base station 100 may drain fluid away from the landing platform 108 (i.e., the alignment members 118 and the slots 120), which supports repositioning of the alignment members 118 in the presence of fluid and inhibits the formation of ice around the alignment members 118 that may otherwise impede the functionality thereof, may drain fluid (e.g., condensation) away from the temperature control system 110 (e.g., the TEC), and may drain water away from the charging hub 112. It is also envisioned that the base station 100 may include one or more additional drain channels in order to facilitate the drainage of fluid from the user panel (FIGS. 1, 2) and/or the intake vent (FIG. 5).

With reference to FIG. 11, in certain embodiments, it is envisioned that the base station 100 may further include (one or more) at least one drain heater 122 (e.g., resistive heater pads) that are configured to de-ice the drain channel(s) and thereby melt ice that might otherwise obstruct the flow of fluid away from the landing platform 108 (i.e., the alignment members 118 and the slots 120), the temperature control system 110 (FIGS. 5 and 9), the charging hub 112 (FIGS. 5-7 and 10), etc.

Figure 12:
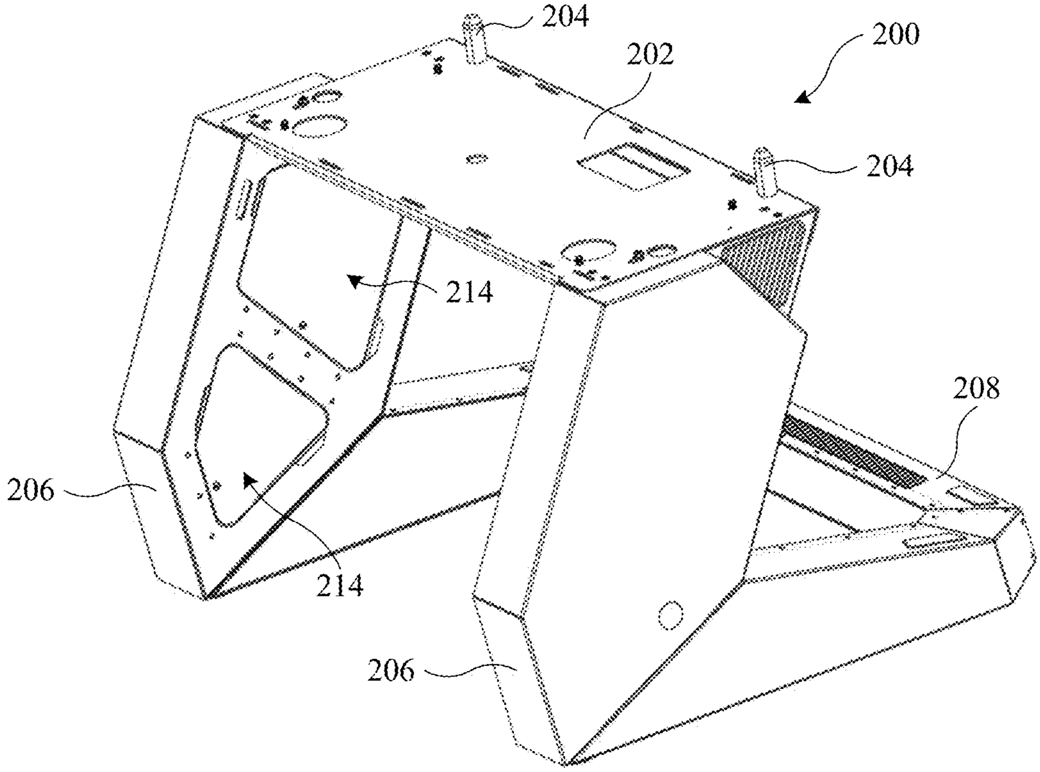
FIG. 12 is a perspective view of the stand.
Figure 13:
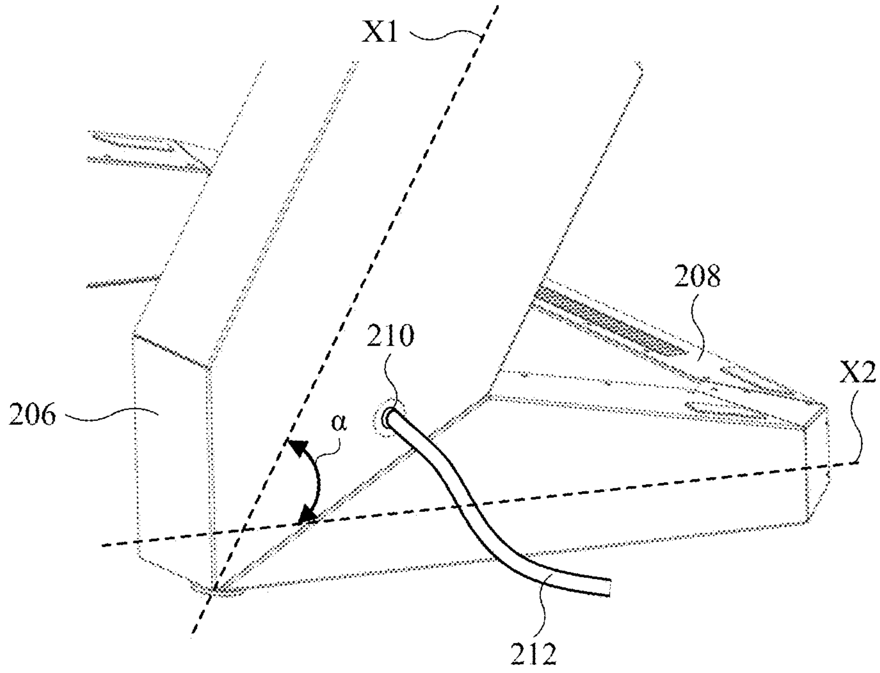
FIG. 13 is a perspective view of the stand illustrating a port that receives a transmission member.
Figure 14:
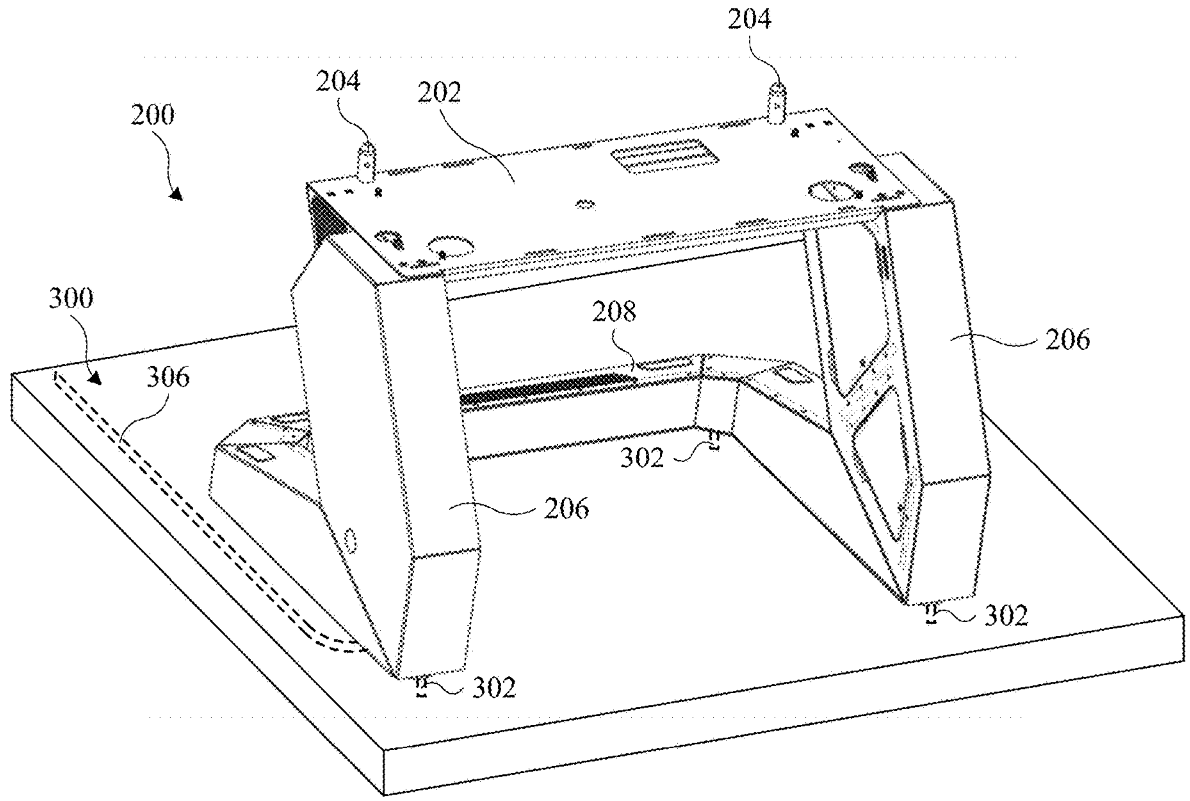
FIG. 14 is a perspective view of the stand connected to a docking site.

With reference now to FIGS. 12-14, the stand 200 will be discussed. The stand 200 is a free-standing structure that is configured to support the base station 100 (and the UAV 10) in an elevated position, as indicated above, which creates free air space that not only reduces turbulence (e.g., propeller wash) during takeoff and landing of the UAV 10, but mitigates the entry of debris (e.g., dust, particulate, etc.) into the base station 100.

The stand 200 includes: a spreader plate 202, which supports and is configured for engagement (contact) with the base station 100; (one or more) at least one alignment pin 204, which extends outwardly (i.e., vertically) from the spreader plate 202 and is configured for insertion into the base station 100 in order to facilitate proper orientation of the base station 100 in relation to the stand 200 and inhibit dislocation of the base station 100 (i.e., separation of the base station 100 and the stand 200) prior to connection; (a pair of) uprights 206, which extend from the spreader plate 202 along a (first) axis X1; and a brace 208, which extends from the uprights 206 along a (second) axis X2.

As seen in FIG. 13, in the illustrated embodiment, the stand 200 is configured such that the axes X1, X2 subtend an angle α therebetween that lies substantially within the range of about 30 degrees to about 75 degrees. Embodiments in which the stand 200 may be configured such that the angle α lies outside of the disclosed range are also envisioned herein (e.g., depending upon the size, weights, etc., of the base station 100), however, and would not be beyond the scope of the present disclosure.

Figure 3:
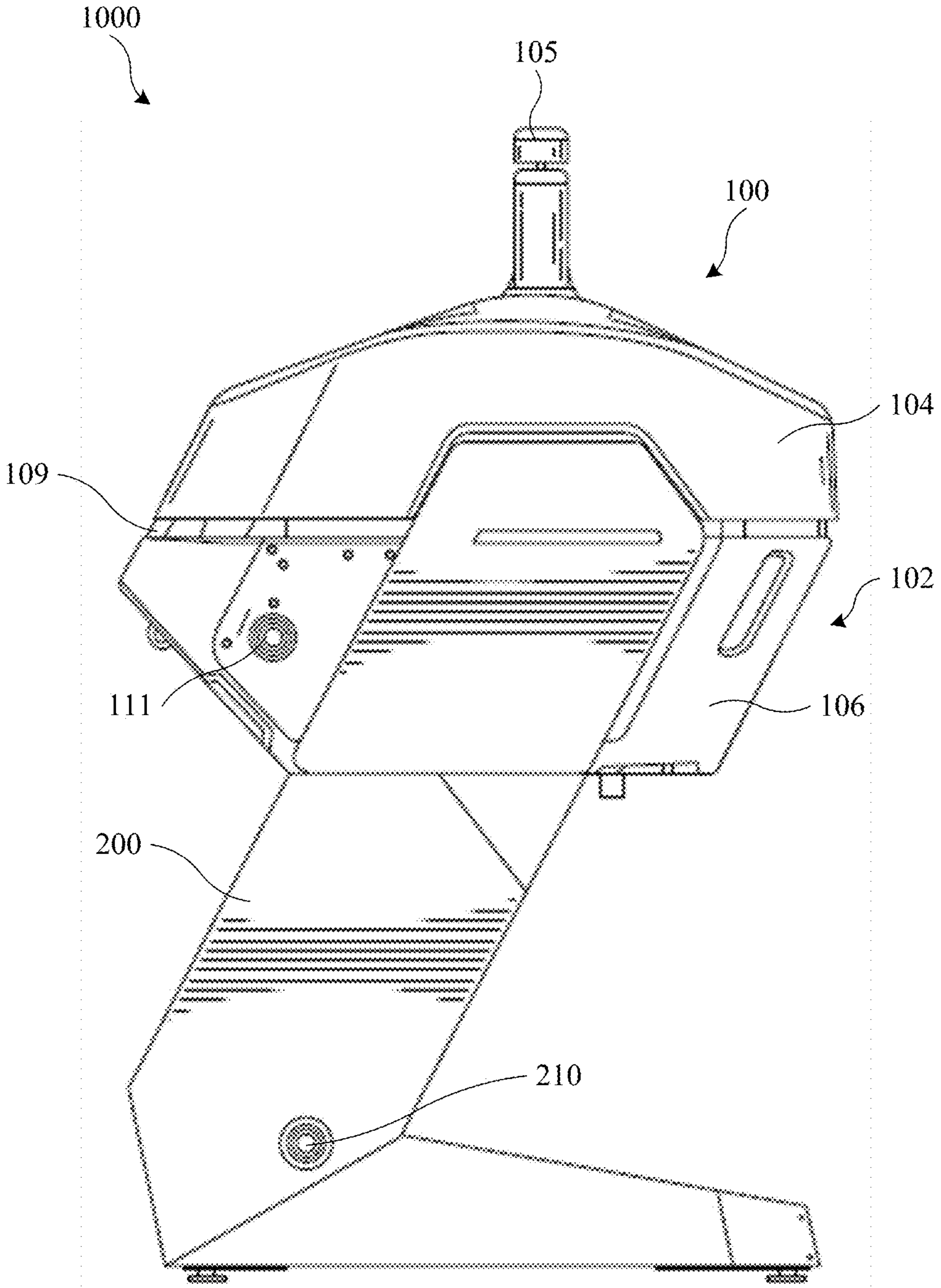
FIG. 3 is a side view of the docking system.
Figure 4:
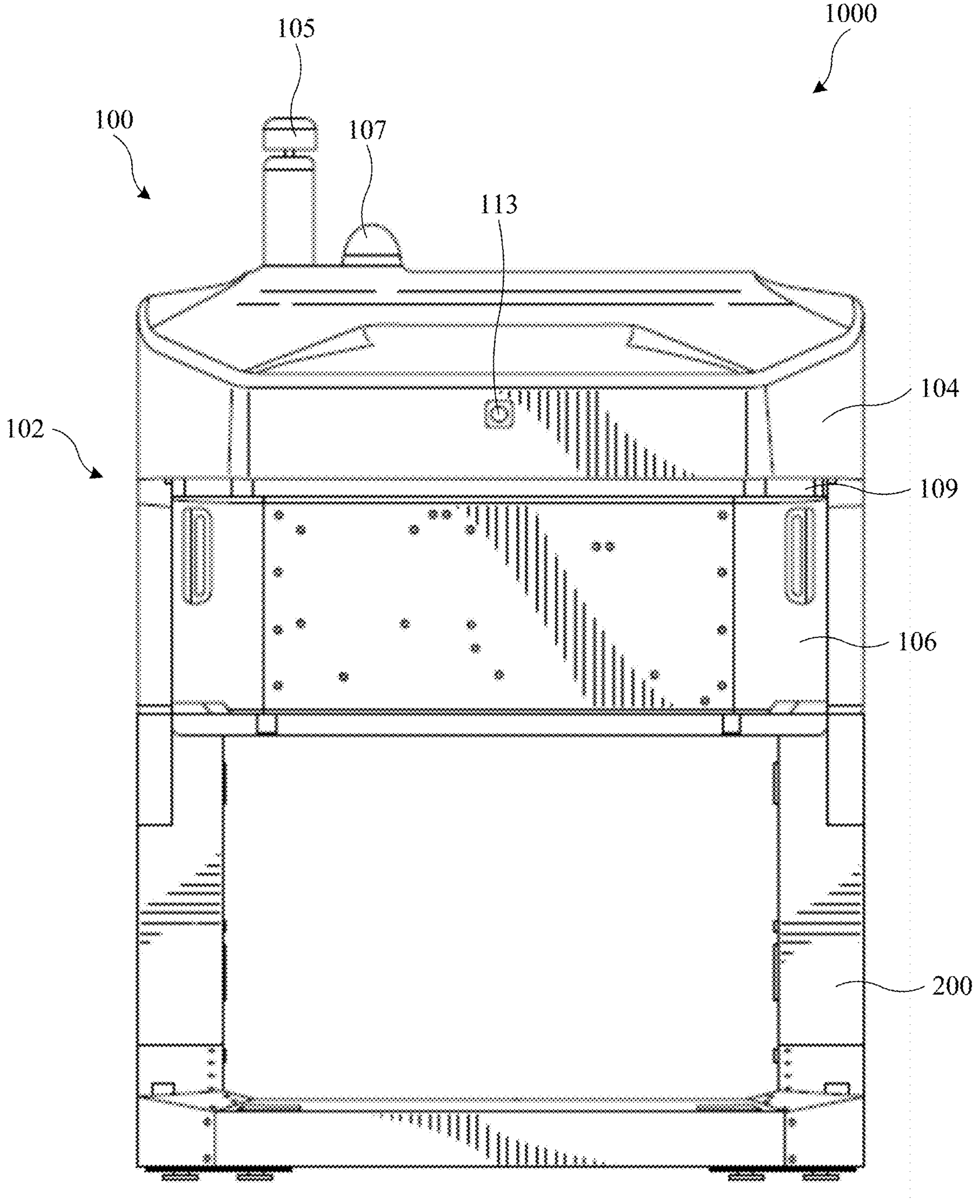
FIG. 4 is a rear view of the docking system.

As seen in FIGS. 1, 3, and 13, the stand 200 includes (one or more) at least one port (e.g., entry point), such as the port 210, which is configured to receive (one or more) at least one (power and/or data) transmission member 212 (e.g., wire(s), cable(s), FPC(s), etc.) to support power and/or data transmission to the base station 100 via the stand 200. Although shown as being included on one of the uprights 206 in the illustrated embodiment, it is envisioned that the port 210 may be included in any suitable location (e.g., the brace 208).

In certain embodiments, it is envisioned that the uprights 206 may include (one or more) at least one storage compartment 214 (FIG. 12) (e.g., for tools, fasteners, etc.). Additionally, or alternatively, it is envisioned that the brace 208 may include a notch to create a locking point.

In certain embodiments, the stand 200 is configured to support long term (e.g., permanent) installation at a docking site and includes (one or more) at least one mounting point that facilitates connection of the stand 200 to a mounting pad 300 (or the like), as seen in FIG. 14, which may include one or more anchors 302, one or more conduits, such as a first conduit 306 for power wiring (e.g., AC wires) and/or a second conduit for data communication (e.g., USB and/or ethernet wiring), or a combination thereof.

Figure 15:
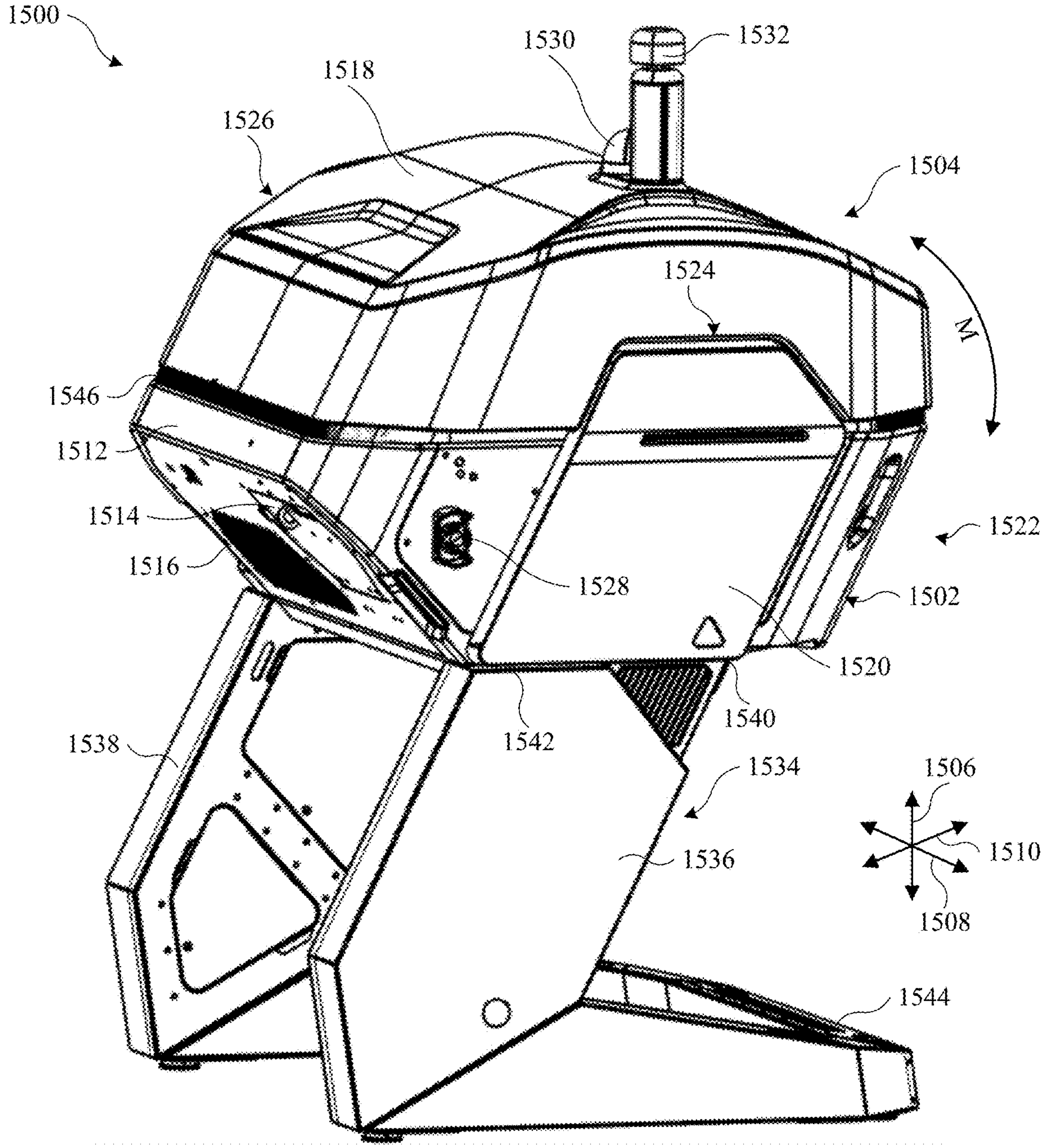
FIG. 15 is a perspective view of a base station for a UAV.
Figure 16:
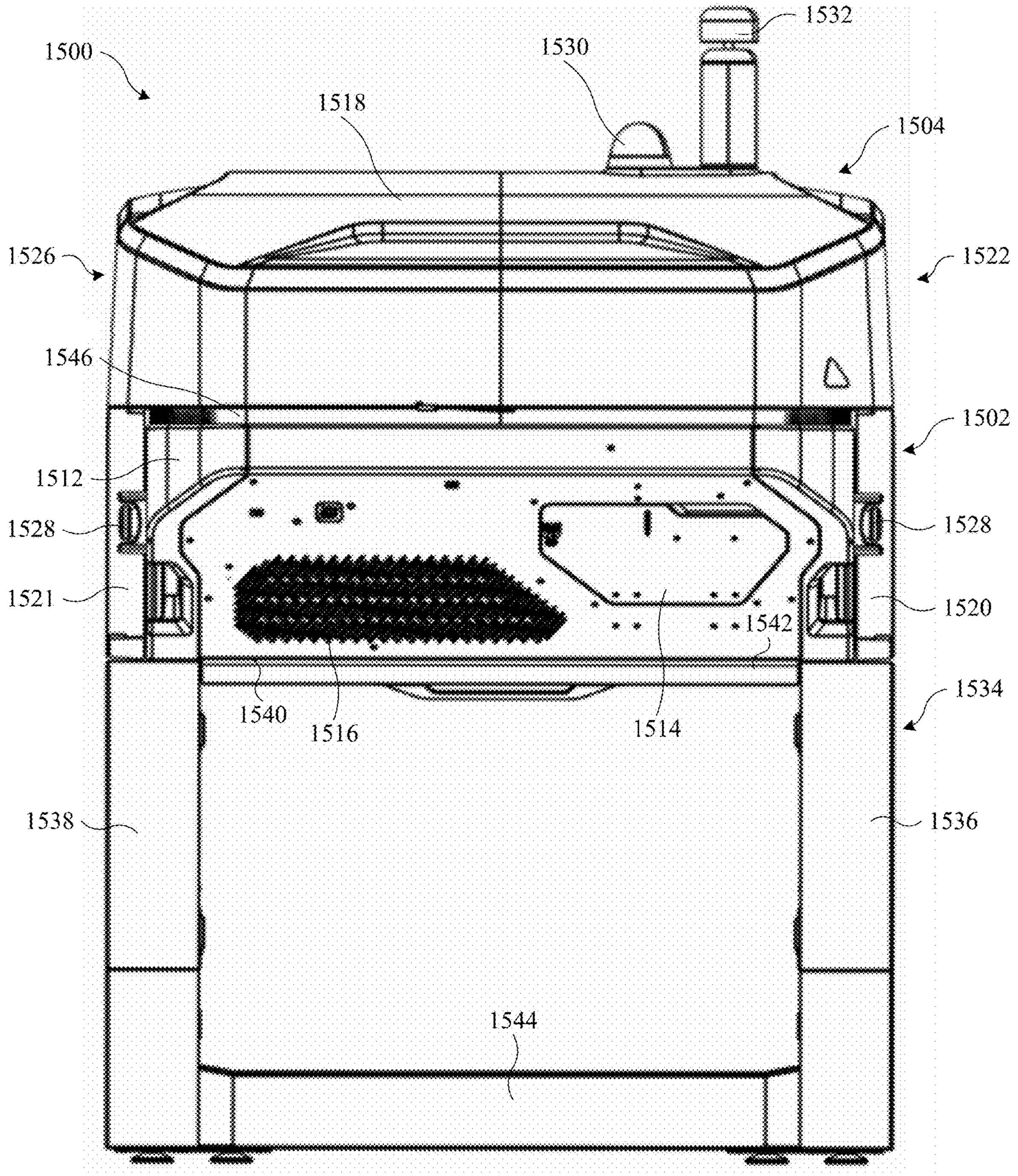
FIG. 16 is a front view of the base station.

FIG. 15 illustrates a perspective view of another example of a base station 1500. FIG. 16 illustrates a front view of the base station 1500 shown in FIG. 16. The base station 1500 may be similar to the base station 100 of FIGS. 1-23 described above unless otherwise stated. By way of example, the base station 1500 may also include a base 1502 and a roof assembly 1504 movably coupled to the base 1502. As discussed further below, the roof assembly 1504 may be movable between an open position, in which the roof assembly 1504 exposes an interior region of the base 1502, and a closed position, in which the roof assembly 1504 at least partially encloses the interior region of the base 1502. FIG. 15 illustrates the closed position of the roof assembly 1504.

The base station 1500 may be configured to house and/or support a UAV, such as the UAV 10. For example, the base 1502 may be or may include a landing platform (e.g., similar to the landing platform 108 of the base station 100). During operation (e.g., flight) of the UAV 10, the UAV 10 may commence a landing sequence, such as based upon recognition of the landing platform and/or one or more fiducial markings thereon, and land on the landing platform. That is, the UAV 10 may be docked on the landing platform and supported by the landing platform.

When the UAV 10 is docked, the roof assembly 1504 may be configured to move to the closed position shown in FIG. 15 to enclose the landing platform and the UAV 10 supported thereon to protect both the landing platform and the UAV 10 from environmental conditions (e.g., precipitation, debris, sunlight, etc.) When an operator wishes to initiate takeoff of the UAV 10 from the landing platform, the roof assembly 1504 may be actuated to move to the open position, whereby the roof assembly 1504 may be located at least partially below the landing platform with respect to an elevational direction 1506 of movement (e.g., an up-and-down direction). For illustrative purposes, the elevational direction 1506 may be considered movement along or parallel to a Z-axis of the base station 1500, which may be transverse to a lateral direction 1508 of movement (e.g., side-to-side movement along or parallel to an X-axis of the base station 1500) and transverse to a longitudinal direction 1510 of movement (e.g., front-to-back movement, or vice versa, along or parallel to a Y-axis of the base station 1500). As such, when the roof assembly 1504 is in the open position, the landing platform—and thus the UAV 10—are unobstructed by the roof assembly 1504 to facilitate takeoff and landing of the UAV 10.

The base 1502 may include a body 1512 that supports the landing platform. The body 1512 may substantially form an overall shape and housing of the base 1502. As discussed further below, the body 1512 may define a cavity therein, which may contain one or more components of the base station 1500, such as the landing platform, at least a portion of the drive system that actuates the roof assembly 1504, a thermal management system of the base station 1500, electronics (e.g., circuitry, wiring, etc.), or a combination thereof. Additionally, the body 1512 may be movably coupled to the roof assembly 1504 and may help facilitate movement of the roof assembly 1504 between the open position and the closed position.

As mentioned above, the body 1512 may include and/or house one or more components of the base station 1500. By way of example, the body 1512 may store one or more electrical components of the base station 1500, such as a control module, wiring (e.g., power and/or data wiring), one or more sensors (e.g., contact sensors, humidity sensors, temperature sensors, etc.), a charging hub configured to charge a power supply of the UAV 10 when docked, or a combination thereof. Such electrical components may be accessible from outside the base station 1500 via an access module 1514 of the body 1512. The access module 1514 may be an access panel, which may open to allow a user to access or otherwise communicate with the electrical components of the base station 1500. For example, the access module 1514 may be opened to expose a port, whereby the user may connect an external electronic device (e.g., laptop, tablet, mobile phone, etc.) to an electrical system of the base station 1500 via a connector connected to the port to thereby establish a communication path between the electronic device and the electrical system.

Additionally, due to potentially heightened operating temperatures of such an electrical system, the body 1512 may also include venting 1516 to dissipate such heat and ensure that the electrical system of the base station 1500 does not overheat. Similarly, as discussed further below, the venting 1516 may provide a point of egress for drainage (e.g., water) that may enter the body 1512. The venting 1516 may be slits, cutouts, or other openings to promote air flow between the interior region of the body 1512 (e.g., the cavity storing the electronic components therein) and an external environment. In some configurations, the base 1502 may also include one or more heat sinks to further promote heat dissipation from the body 1512. In an example, the electronic components of the base station 1500 may include one or more printed circuit boards (PCBs), which may be coupled to one or more heat sinks located within the body 1512. The one or more heat sinks may be coupled to the body 1512 such that heat generated by the PCBs may be transferred through the one or more heat sinks to the body 1512, at which point the heat may be dissipated into the external environment.

As discussed above, the roof assembly 1504 may be movable coupled to the base 1502. As shown in FIG. 15, the roof assembly 1504 may include a cover 1518 and one or more ears, such a first ear 1520 coupled to the cover 1518 and movably coupled to the body 1512. For example, the first ear 1520 may be coupled to a first side 1522 (e.g., a first lateral side) of the cover 1518, such as within a groove 1524 defined by the cover 1518 and located on the first side 1522 of the cover 1518. The first ear 1520 may extend downward from the cover 1518 with respect to the elevational direction 1506 and coupled to the first side 1522 of the base 1502 (e.g., the first side 1522 of the body 1512) to establish a pivot therebetween.

The roof assembly 1504 may further include a second ear 1521, which may be similar to the first ear 1520 described above, that is coupled to an opposing second side 1526 of the cover 1518. For example, the second ear 1521 may extend downward from the cover 1518 with respect to the elevational direction 1506 and may be coupled to the opposing second side 1526 of the base 1502 (e.g., the opposing second side 1526 of the body 1512) to establish a pivot therebetween. Thus, based on actuation by the drive system of the base station 1500, the first ear 1520 and the second ear 1521 may facilitate movement of the roof assembly 1504 in a direction of movement (M) between the closed position and the open position. That is, the roof assembly 1504 may be rotatable through an angular range of motion that is defined by the first ear 1520 and the second ear 1521. It should also be noted that, in some configurations, the roof assembly 1504 may only include the first ear 1520 or the second ear 1521. For example, the roof assembly 1504 may be rotatable through the angular range of motion defined by the first ear 1520 and the second ear 1521 such that the roof assembly 1504 may be positioned at least partially between the base 1502 and a stand 1534 of the base station 1500 when the roof assembly 1504 is in the open position.

Actuation of the roof assembly 1504 may be done manually and/or remotely. For manual operation, the base station 1500 may include a manual override state in which a user may manually articulate the roof assembly 1504 between the closed position and the open position. For example, the base station 1500 may enter the manual override state for maintenance or during a power outage. However, it is envisioned that the roof assembly 1504 may generally be actuated remotely. For example, when the UAV 10 initiates a takeoff sequence, the takeoff sequence may include communicating with the base station (e.g., via wireless or wired communication) so that the roof assembly 1504 may be actuated in the direction of movement (M) to the open position. Similarly, when the UAV 10 lands on the landing platform, the base station 1500 may detect the UAV 10 (or the UAV 10 may communicate with the base station 1500 that it has landed), at which point the roof assembly 1504 may be actuated in the direction of movement (M) to the closed position.

Moreover, a user may actuate the roof assembly 1504 based upon user input, such as via an external electronic device in communication with the base station 1500 and/or a user interface disposed on the base station 1500, such as the user interface 1528. For example, the user interface 1528 may be disposed along an exterior surface of the body 1512, such as along the first side 1522 and/or the opposing second side 1526 of the body 1512. The user may interact with the user interface 1528 (e.g., push, contact, slide, switch, etc.) to activate movement of the roof assembly 1504.

Similarly, in certain circumstances the user may wish to manually stop actuation of the roof assembly 1504. For example, the user may wish to initiate an emergency stop of the roof assembly 1504 midway through actuation of the roof assembly 1504 between the open position and the closed position. In such a case, the user may stop movement of the roof assembly 1504 between the closed position and the open position by interacting with the user interface 1528.

As discussed above, the base station 1500 may include one or more electrical components that are disposed within the cavity of the body 1512. The base station 1500 may include one or more electrical components, such as one or more sensors, along an exterior of the body 1512 and/or the cover 1518. For example, as shown in FIG. 15, the roof assembly 1504 may include a rain sensor 1530 (e.g., to detect rain or a severity thereof) and a wind sensor 1532 (e.g., to detect wind or a severity thereof) coupled to an exterior surface of the cover 1518, such as along a top exterior surface of the cover 1518 so that the rain sensor 1530 and the wind sensor 1532 are located above substantially all of the base station 1500 in the elevational direction 1506. As such, the rain sensor 1530 and the wind sensor 1532 may detect rain and wind, respectively, substantially unencumbered by the base station 1500. It should be noted that any type of sensor may be disposed along the exterior surface of the base station 1500. For example, the base station 1500 may include one or more contact sensors, one or more pressure sensors, one or more temperature sensors, other sensors, or a combination thereof disposed along the exterior surface of the base station 1500.

Turning back to FIG. 15, the first ear 1520 and the second ear 1521 may be coupled to the body 1512 such that the roof assembly 1504 is movable (e.g., in the direction of movement (M)) between the closed position, in which the cover 1518 is configured to enclose the landing platform and the UAV 10 supported thereon, and an open position, in which the cover is located at least partially below the landing platform (e.g., below the body 1512) with respect to the elevational direction 1506 such that the landing platform is unobstructed by the cover 1518 to facilitate takeoff and landing of the UAV 10. To facilitate such articulation of the roof assembly 1504, the base 1502 may be coupled to the stand 1534.

The stand 1534 may include one or more legs, such as the first leg 1536 and the second leg 1538, which may support the base 1502 and thus also support the roof assembly 1504. For example, a lower surface 1540 of the body 1512 may be supported along an upper surface 1542 of the first leg 1536 and/or the second leg 1538. The first leg 1536 and/or the second leg 1538 may substantially define a clearance height for articulation of the roof assembly 1504. That is, the first leg 1536 and/or the second leg 1538 may extend upward in the elevational direction 1506 such that the base 1502 is raised above the ground to thereby provide an area in which the roof assembly 1504 is free to articulate at least partially beneath the body 1512 (e.g., in the open position). The first leg 1536 and the second leg 1538 may also be coupled to one another and/or further structurally reinforced by a frame 1544. As shown in FIG. 15 the frame 1544 may extend between the first leg 1536 and the second leg 1538 (e.g., may extend between the first side 1522 and the opposing second side 1526 of the base station 1500) to improve stability of the stand 1534.

To further improve operation of the base station 1500, the base station 1500 may include indicator lighting 1546 extending at least partially around a perimeter (e.g., a periphery) of the base 1502. The indicator lighting 1546 may remain unobstructed by the roof assembly 1504 when the roof assembly 1504 is in the open position and when the roof assembly 1504 is in the closed position. That is, the indicator lighting 1546 may remain unobstructed by the roof assembly 1504 before, during, and after actuation of the roof assembly 1504. As such, the indicator lighting 1546 may provide a visual indication of activity of the base station 1500. In an example, the indicator lighting 1546 may illuminate during opening and/or closing of the roof assembly 1504.

Similarly, the indicator lighting 1546 may illuminate when the UAV 10 is docked within the base station 1500, when the base station 1500 is receiving power from an external power source, when the base station 1500 is malfunctioning, or a combination thereof. Illumination herein by the indicator lighting 1546 may be considered any lighting provided by the indicator lighting 1546 in any color, pattern (e.g., rate of pulsing), intensity, or a combination thereof. The indicator lighting 1546 may also be any lighting component that may facilitate such illumination, such as, for example, an LED panel (e.g., a backlit and/or edge-lit LED panel), fluorescent lighting, LED strips, or a combination thereof. However, the indicator lighting 1546 is not limited to any particular lighting component.

As shown in FIG. 15, the base station 1500 may be configured to substantially prevent moisture and/or debris from entering the confines of the base 1502 when the roof assembly 1504 is in the closed position. For example, the roof assembly 1504 may be shaped such that water (e.g., rain) which lands on the cover 1518 may be directed away from the confines of the body 1512 to prevent the water from penetrating the base station 1500 and contacting one or more of the landing platform (including the UAV 10, which may be supported thereon), the electronics located within the base 1502, or the thermal management system located within the base 1502. In an example, a portion of the base 1502, such as the landing platform and/or indicator lighting 1546, may be at least partially nested within the roof assembly 1504 (e.g., within the cover 1518) so that the water may be directed over the surface of the cover 1518 and away from the base 1502. As such, the cover 1518 may dimensionally span a greater distance in the lateral direction 1508 and/or the longitudinal direction 1510 compared to the base 1502 to cover the base 1502 and protect the base 1502 from the water.

Figure 17:
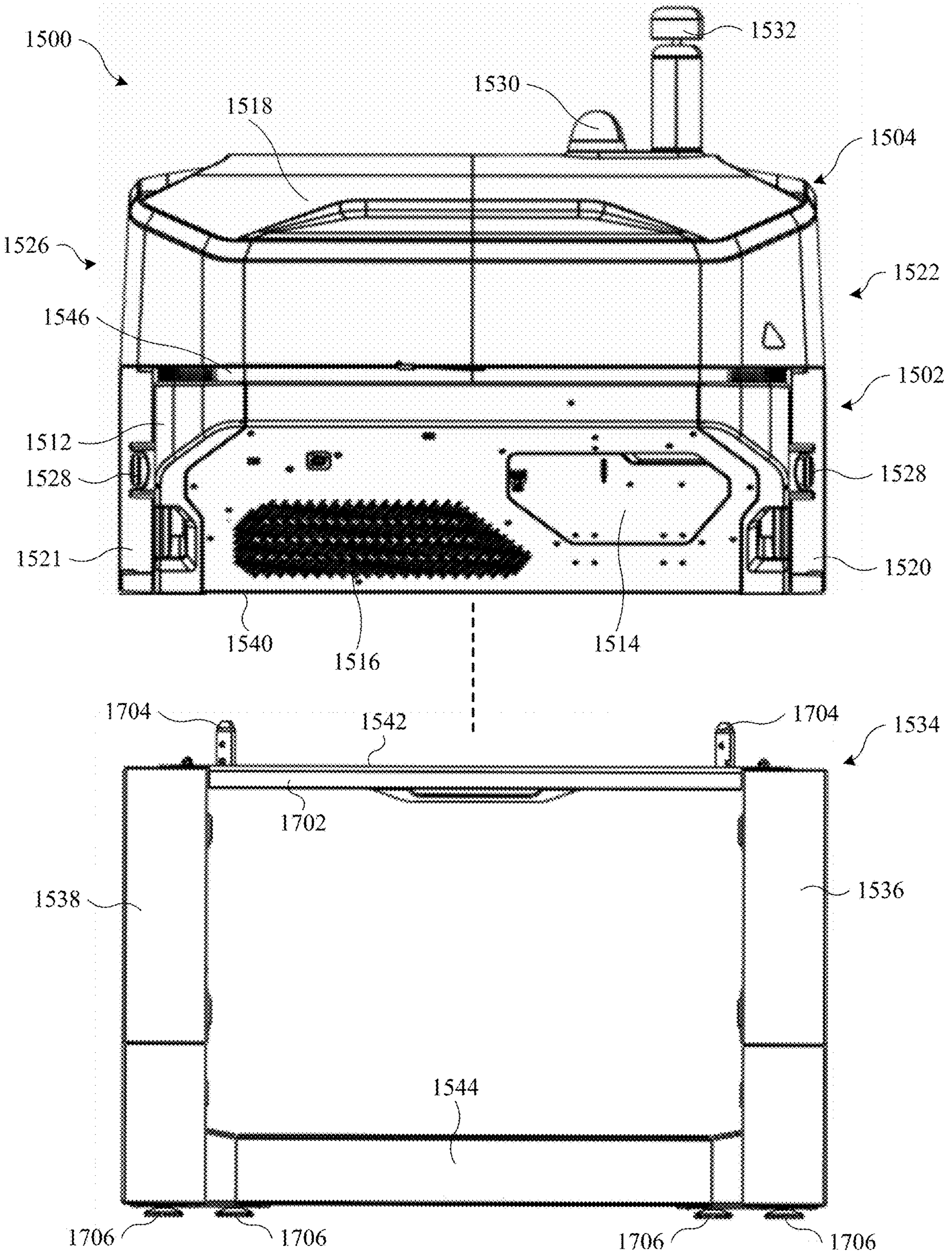
FIG. 17 is a partially exploded view of the base station.

FIG. 17 illustrates a partially exploded view of the base station 1500. As discussed above, the base station 1500 (e.g., the base 1502 and/or the roof assembly 1504) may be supported by the stand 1534. For example, the stand 1534 may be coupled to the base 1502 and configured to support the base 1502 thereon.

The stand 1534 may include the first leg 1536 located on the first side 1522 of the base station 1500, the second leg 1538 located on the opposing second side 1526 of the base station 1500, and the frame 1544, which may extend between the first leg 1536 and the second leg 1538. For example, the frame 1544 may be a crossbar or other stabilizing structure that extends between the first leg 1536 and the second leg 1538 and is coupled to both the first leg 1536 and the second leg 1538. As such, the frame 1544 may substantially prevent unwanted movement between the first leg 1536 and the second leg 1538. Coupling of the frame 1544 to the first leg 1536 and the second leg 1538 is not particularly limited and can be done using any mechanical engagement (e.g., fasteners, locking mechanisms, etc.), adhesives, bonding (e.g., welding), or other techniques.

The stand 1534 may further include a spreader plate 1702 supported by at least one of the first leg 1536 and the second leg 1538. The spreader plate 1702 may be configured to support the base 1502 of the base station 1500. For example, as shown in FIG. 17, the spreader plate 1702 may define the upper surface 1542 of the stand 1534 and the lower surface 1540 of the base 1502 may abut the upper surface 1542 of the spreader plate 1702 so that the base 1502 is supported by the stand 1534. As shown in FIG. 17, the frame 1544 may be spaced apart from the spreader plate 1702, such as in the elevational direction 1506 of the base station 1500. Moreover, the frame 1544 and the spreader plate 1702 may extend along planes that are substantially parallel to one another or skewed to one another. As such, the first leg 1536 and/or the second leg 1538 may extend substantially perpendicular to the frame 1544 and the spreader plate 1702. However, such orientation is not particularly limited to being substantially perpendicular.

To facilitate proper alignment and/or engagement between the stand 1534 and the base 1502, the spreader plate 1702 may include one or more guide pins, such as the guide pins 1704 that are received by the base 1502 (e.g., the body 1512) to align the base 1502 with the stand 1534. For example, the spreader plate 1702 may include a pair of the guide pins 1704 that project away from the spreader plate 1702 (e.g., away from the upper surface 1542 of the spreader plate 1702), whereby the pair of the guide pins 1704 may be receivable by the base station 1500 (e.g., by the base 1502 of the base station 1500) to align the base station 1500 (e.g., the base 1502 of the base station 1500) with the stand 1534. The base 1502 may then be secured to the spreader plate 1702 when the base 1502 is aligned with the stand 1534. For example, as discussed further below, the spreader plate 1702 and the base 1502 may be coupled to one another via one or more fasteners. As such, the guide pins 1704 may ensure that the base 1502 and the spreader plate 1702 are properly aligned such that the fasteners may properly connect the base 1502 to the spreader plate 1702.

To further improve stability of the base station 1500, the stand 1534 may include one or more adjustable feet, such as the adjustable feet 1706. As discussed further below, the adjustable feet 1706 may be configured to adjust a height of the stand 1534—and thus also a height of the base station 1500. The adjustable feet 1706 may further provide means for leveling the base station 1500 on an uneven surface or platform. For example, each of the adjustable feet 1706 may be independently adjusted (e.g., a height thereof) to ensure that the base station 1500 remains substantially level.

Figure 18A:
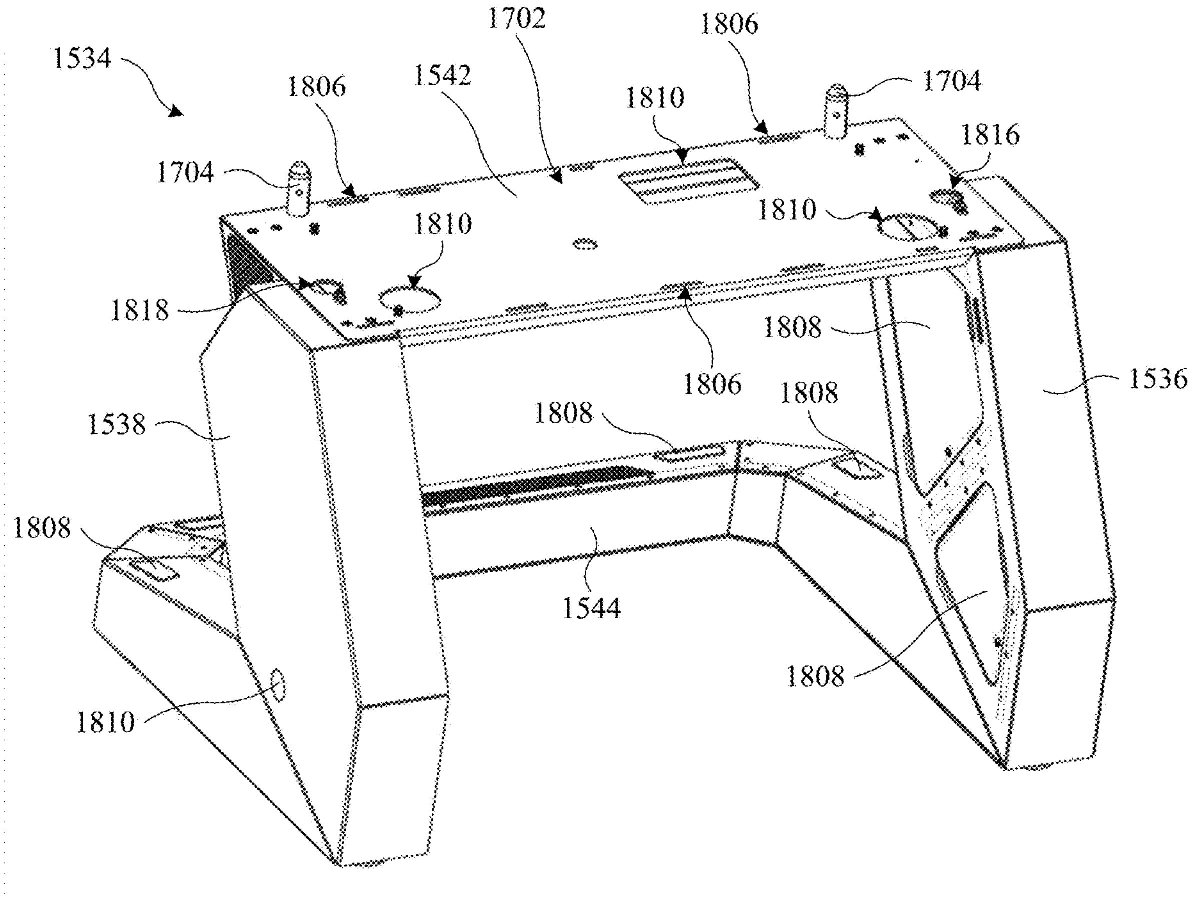
FIG. 18A is a perspective view of a stand of the base station.
Figure 18B:
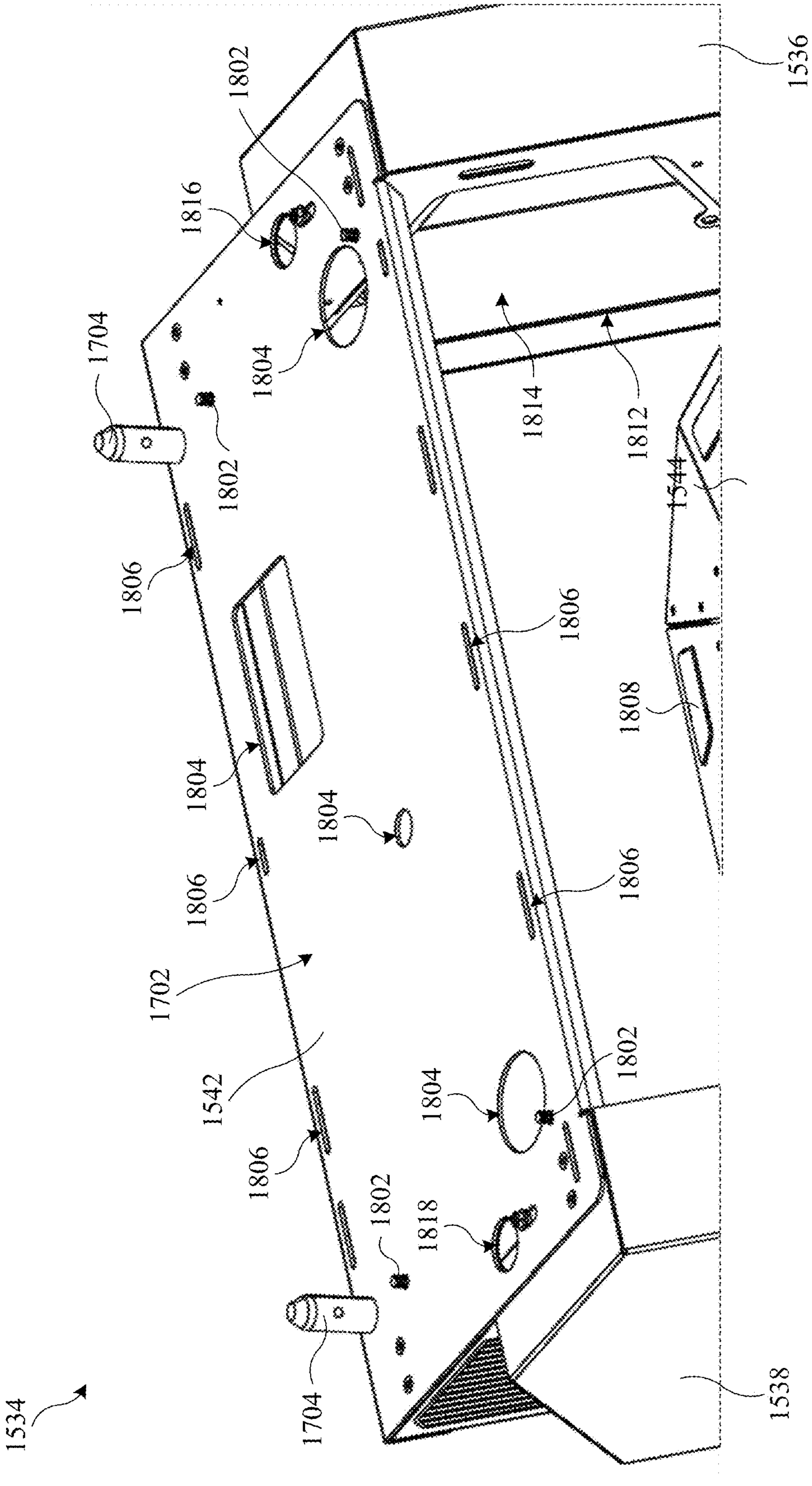
FIG. 18B is a close-up perspective view of the stand shown in FIG. 18A.

FIG. 18A illustrates a perspective view of the stand 1534 of the base station 1500. FIG. 18B is a close-up perspective view of the stand 1534 shown in FIG. 18A. As discussed above, the stand 1534 may be configured to support the base 1502 of the base station 1500 and may be coupled to the base 1502.

By way of example, the base 1502 may be positioned on the upper surface 1542 of the stand 1534 that is defined by the spreader plate 1702, which may be coupled to and supported by the first leg 1536 and the second leg 1538. The base 1502 may receive the guide pins 1704 projecting (e.g., extending) from the upper surface 1542 of the spreader plate 1702 to align the base 1502 with the stand 1534. As such, one or more fasteners, such as the fasteners 1802, may be properly aligned to couple the base 1502 to the stand 1534 (e.g., to the spreader plate 1702) to support the base 1502 thereon. For example, the fasteners 1802 may extend from the spreader plate 1702 and be received by mounting holes defined by the base 1502 (e.g., defined by the body 1512 of the base 1502). The fasteners 1802 are not particularly limited to any specific type of fastener. For example, the fasteners 1802 may be bolts (e.g., bolts that are secured to the base 1502 and/or the stand 1534 via threaded nuts), screws, mechanical interlocks, clips, other types or fasteners, or a combination thereof.

Proper alignment between the base 1502 and the stand 1534 may also help align one or more additional features of the spreader plate 1702 with the base 1502. For example, the spreader plate 1702 may define one or more cutouts 1804, which may be aligned with portions of the base 1502, such as features along the lower surface 1540 of the base 1502, to permit access to such features. By way of example, the one or more cutouts 1804 may be aligned with electrical connections of the base 1502, mounting features of the base 1502, openings defined by the base 1502, other features of the base 1502, or a combination thereof. Similarly, the spreader plate 1702 may further define one or more drain slots, such as the drain slots 1806, which may be aligned with drain slots defined by the base 1502 (e.g., defined by the body 1512 of the base 1502). As such, if moisture (e.g., water) enters an interior cavity defined by the body 1512, the moisture may egress through the drain slots of the base 1502 and thus also through the drain slots 1806 of the spreader plate 1702. Thus, the spreader plate 1702 need not obstruct proper drainage of moisture out of the base 1502.

When the base 1502 is coupled to the stand 1534, the stand 1534 may be configured to support one or more of power transmission and data transmission to the base station 1500 (e.g., to the base 1502) via the stand 1534. By way of example, wiring may be routed through all or a portion of the stand 1534 such that the wiring may be connected to the base 1502 to provide power transmission and/or data transmission to the base station 1500. For example, the first leg 1536 and/or the second leg 1538 may define a cavity therein, whereby the wiring may be routed through such cavities to reach the base 1502.

As shown in FIG. 18A, the first leg 1536 and/or the second leg 1538 may include one or more access panels, such as the access panels 1808, one or more punchouts, such as the punchouts 1810, or both. The access panels 1808 and/or the punchouts 1810 may enclose one or more respective openings of the first leg 1536 and/or the second leg 1538, such as the opening 1812, that permit access to the cavities defined by the first leg 1536 and/or the second leg 1538, such as a first cavity 1814 defined by the first leg 1536.

That is, the first leg 1536 may define the first cavity 1814 therein that may be accessible through one or more openings (e.g., the opening 1812) of the first leg 1536 and the second leg 1538 may define a second cavity therein that may be accessible through one or more openings of the second leg 1538. As such, the first cavity 1814 may permit routing of the wiring through the first leg 1536 to connect the wiring to the base station 1500 and the second cavity may permit routing of the wiring or the additional wiring through the second leg 1538 to connect the wiring or the additional wiring to the base station 1500. For example, the wiring routed through the first leg 1536 may be configured to transmit power to the base station 1500 via the stand 1534 and the additional wiring routed through the second leg 1538 may be configured to transmit data to the base station 1500 via the stand 1534.

As such, removal of the access panels 1808 and/or the punchouts 1810 may allow the wiring to be routed through the first leg 1536 and/or the second leg 1538 to reach the base 1502. By way of example, the wiring may be routed into the cavity of the second leg 1538 through one of the punchouts 1810 located on the second leg 1538, at which point the wiring may be accessed through one or more of the access panels 1808 located along the second leg 1538 to manipulate the wiring and route the wiring through the second leg 1538 towards the body 1512.

A similar structure may also exist for the frame 1544. For example, the frame 1544 may define a frame cavity therein, which may be accessible through one or more of the access panels 1808 and/or one or more of the punchouts 1810. As such, the wiring may also be routed through all or a portion of the frame 1544 to connect the wiring to the base 1502.

Furthermore, to ensure that the wiring is properly routed to the base 1502, the spreader plate 1702 may further define one or more apertures, such as a first aperture 1816 and a second aperture 1818. As such, the wiring may be routed through the spreader plate 1702 (e.g., through the first aperture 1816 and/or the second aperture 1818) and into the base 1502 unobstructed by the spreader plate 1702.

Figure 19:
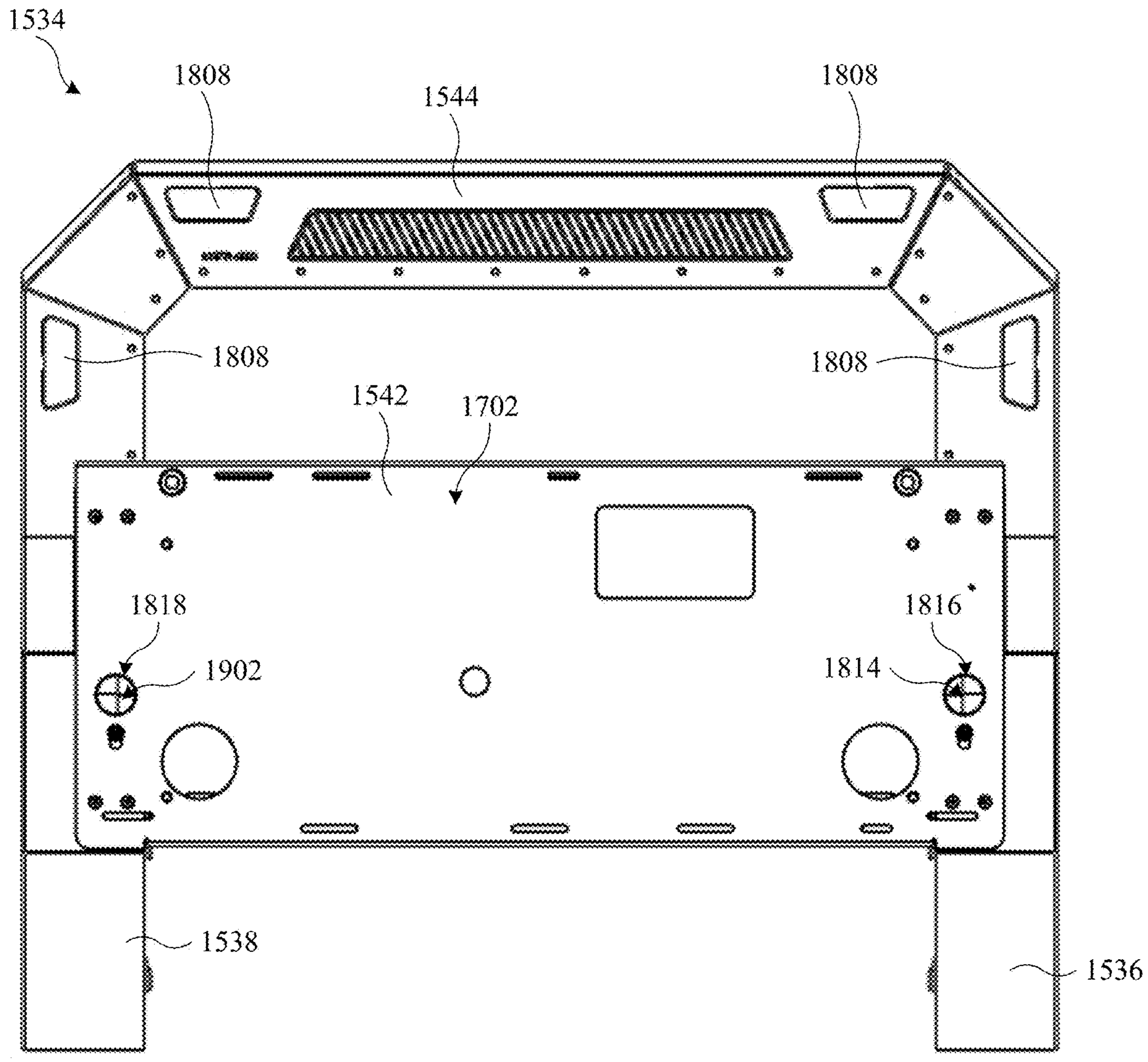
FIG. 19 is a top view of the stand.
Figure 20:
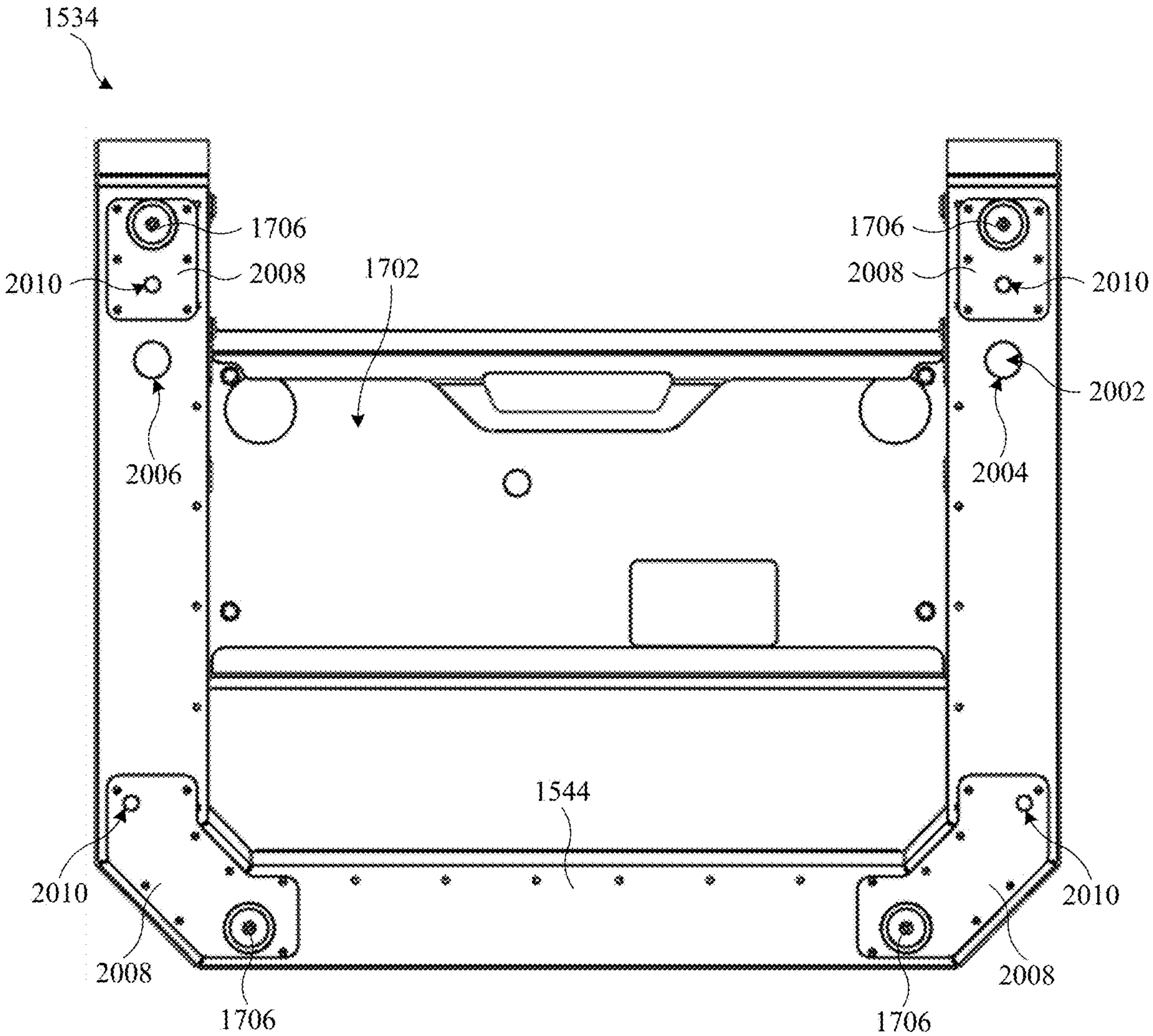
FIG. 20 is a bottom view of the stand.

FIG. 19 is a top view of the stand 1534 and FIG. 20 is a bottom view of the stand 1534 to better illustrate possible avenues to route the wiring through the stand 1534 to connect the wiring to the base station 1500 (e.g., to the base 1502). As discussed above and shown in FIG. 19, the spreader plate 1702 may define one or more apertures that permit access to one or more of the first cavity 1814 defined by the first leg 1536 and the second cavity 1902 of the second leg 1538, which may be similar to the first cavity 1814 unless otherwise stated. In particular, the spreader plate 1702 may define the first aperture 1816 that permits access to the first cavity 1814 of the first leg 1536. The spreader plate 1702 may also define the second aperture 1818 that permits access to the second cavity 1902 of the second leg 1538. As such, wiring that is routed through the first leg 1536 (e.g., the first cavity 1814) may be routed through the first aperture 1816 and into the base 1502 for connection. Similarly, wiring that is routed through the second leg 1538 (e.g., the second cavity 1902) may be routed through the second aperture 1818 and into the base 1502 for connection.

To further illustrate connection of the base station 1500 for power and/or data transmission, FIG. 20 will now be discussed in further detail. As discussed above, the frame 1544 may extend between the first leg 1536 and the second leg 1538, and may define cavity (e.g., a frame cavity 2002) therein. The frame cavity 2002 may be accessible through the first cavity 1814 of the first leg 1536 and/or the second cavity 1902 of the second leg 1538 to permit routing the wiring through the frame 1544 and into the first cavity 1814 and/or the second cavity 1902. The frame cavity 2002 may also be accessible through one or more apertures defined by the frame 1544, such as a first aperture 2004 and a second aperture 2006, which may be located near the first leg 1536 and the second leg 1538, respectively. As such, the wiring may be routable through one or more of the first cavity 1814, the second cavity 1902, and the frame cavity 2002 to transmit one or more of power and data to the base station 1500 (e.g., the base 1502) via the stand 1534.

By way of example, the wiring may be routable through the stand 1534 to connect the wiring to the base 1502 by routing the wiring into the frame cavity 2002 (e.g., through the first aperture 2004 and/or the second aperture 2006 of the frame 1544), through the frame cavity 2002, into the first cavity 1814 of the first leg 1536, and through the first cavity 1814 such that the wiring exits the first cavity 1814 through the one or more apertures of the spreader plate 1702, such as the first aperture 1816 of the spreader plate 1702. Similarly, the wiring may be routable through the stand 1534 to connect the wiring to the base 1502 by routing the wiring into the frame cavity 2002 (e.g., through the first aperture 2004 and/or the second aperture 2006 of the frame 1544), through the frame cavity 2002, into the second cavity 1902 of the second leg 1538, and through the second cavity 1902 such that the wiring exits the second cavity 1902 through the one or more apertures of the spreader plate 1702, such as the second aperture 1818 of the spreader plate 1702.

In addition to facilitating wiring of the base station 1500, the frame 1544 may also stabilize and/or secure the base station 1500. For example, as shown in FIGS. 19 and 20, the frame 1544 may extend outboard (e.g., away from) the base 1502 in the longitudinal direction 1510 and/or the lateral direction 1508. As a result, the frame 1544 and thus the stand 1534 may include counterweighting measures (e.g., weights, mounting, etc.) or otherwise provide counterweighting such that the stand 1534 may remain stationary when the roof assembly 1504 of the base station 1500 moves between the close position and the open position with respect to the base station 1500. That is, the frame 1544 may provide an anti-tipping measure to ensure that the base station 1500 remains upright during operation even if the stand 1534 is not anchored to the ground or another surface.

Though the stand 1534 may facilitate freestanding of the base station 1500, the base station 1500 may also be anchored to the ground or another surface. For example, as shown in FIG. 20, the adjustable feet 1706 may be secured to the frame 1544 via plates 2008, which may be braces, brackets, stiffeners, or other mounting plates. While the adjustable feet 1706 are supported by the ground or another surface, anchors may extend through anchor holes 2010 defined by one or more of the plates 2008 and into the ground or another surface to anchor the stand 1534—and thus the base station 1500—to the ground or another surface. As such, the stand 1534 may provide various means to support and/or secure the base station 1500 during operation.

Figure 21:
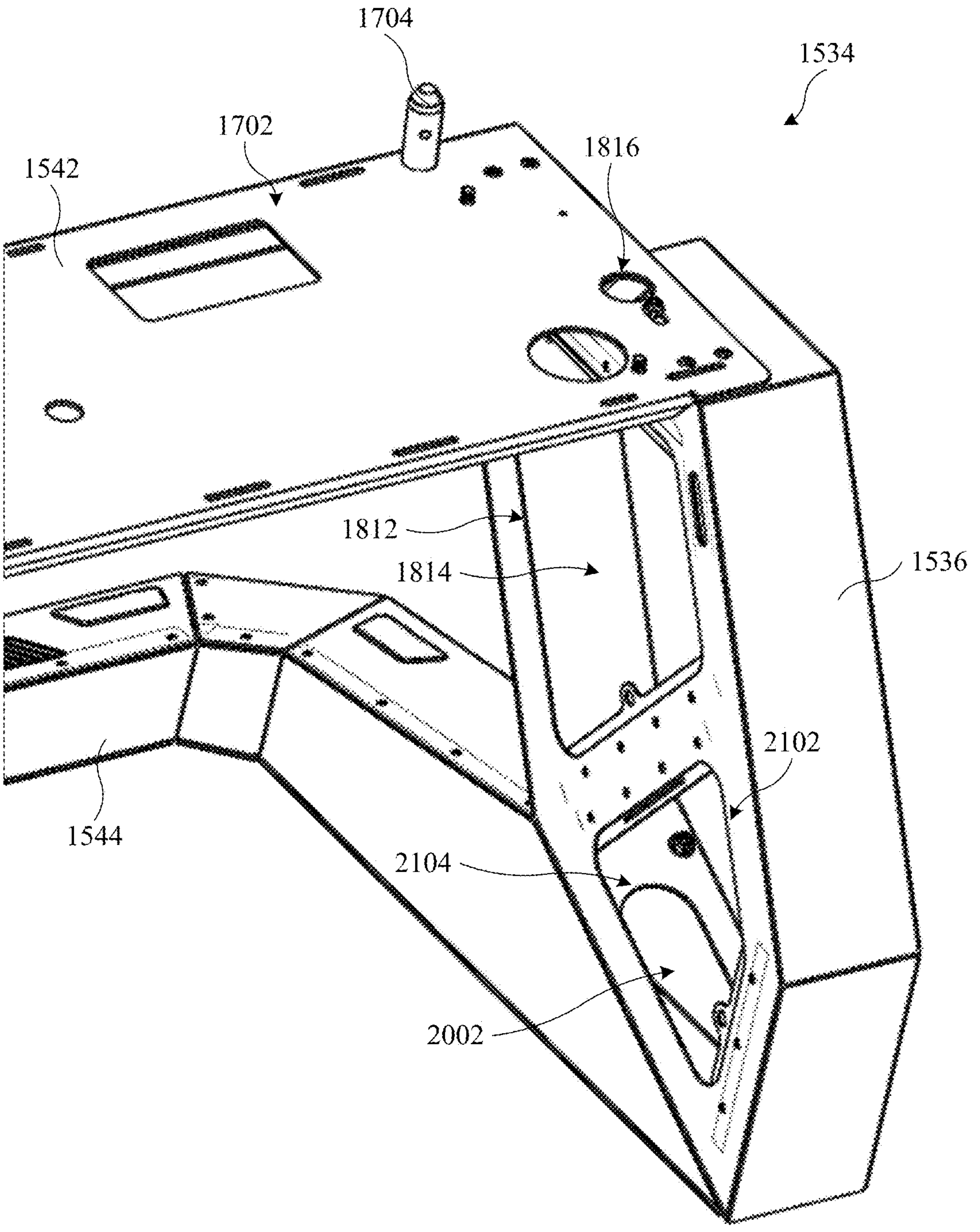
FIG. 21 is a perspective view of the stand illustrating an interior of the stand.

FIG. 21 illustrates another close-up perspective view of the stand 1534 to further illustrate an interior of the stand 1534. As discussed above, the first leg 1536 may define the first cavity 1814 therein and the second leg 1538 may define the second cavity 1902 therein. For example, as shown in FIG. 21, the first cavity 1814 of the first leg 1536 may be accessible via one or more openings, such as the opening 1812 and the additional opening 2102, whereby the opening 1812 and/or the additional opening 2102 may be enclosed by one or more access panels, such as the access panels 1808 shown in FIG. 18A. As such, wiring may be routed through the first cavity 1814 of the first leg 1536 and through the first aperture 1816 of the spreader plate 1702 to reach the base 1502 for connection. It should also be noted that first cavity 1814 may also provide storage (e.g., a storage compartment) to store additional items, such as tools and/or accessories for the base station 1500 or the UAV 10 supported thereon. It should also be noted that while only the first leg 1536 is illustrated in FIG. 21, a similar configuration may be present for the second leg 1538. That is, the second cavity 1902 of the second leg 1538 may also be accessible through one or more openings defined by the second leg 1538, which may also be covered by one or more of the access panels 1808.

The first cavity 1814 of the first leg 1536 and/or the second cavity 1902 of the second leg 1538 may be in communication with the frame cavity 2002 of the frame 1544. For example, the frame 1544 may define one or more openings, such as a first opening 2104 located near the first leg 1536 and/or an opposing second opening located near the second leg 1538. The first leg 1536 and the second leg 1538 may be connected to the frame 1544 such that the first opening 2104 and the second opening of the frame 1544 are accessible through the first leg 1536 and the second leg 1538, respectively. That is, the first opening 2104 of the frame 1544 may be aligned with the first leg 1536 such that the frame cavity 2002 may be accessible through the first opening 2104 of the frame 1544 from within the first cavity 1814 of the first leg 1536. Similarly, the second opening (e.g., the second opening opposing the first opening 2104 near an opposing side of the frame 1544) may be aligned with the second leg 1538 such that the frame cavity 2002 may be accessible through the second opening of the frame 1544 from within the second cavity 1902 of the second leg 1538. As such, wiring may be routed directly through the frame 1544 into the first cavity 1814 of the first leg 1536 and/or the second cavity 1902 of the second leg 1538.

Figure 22:
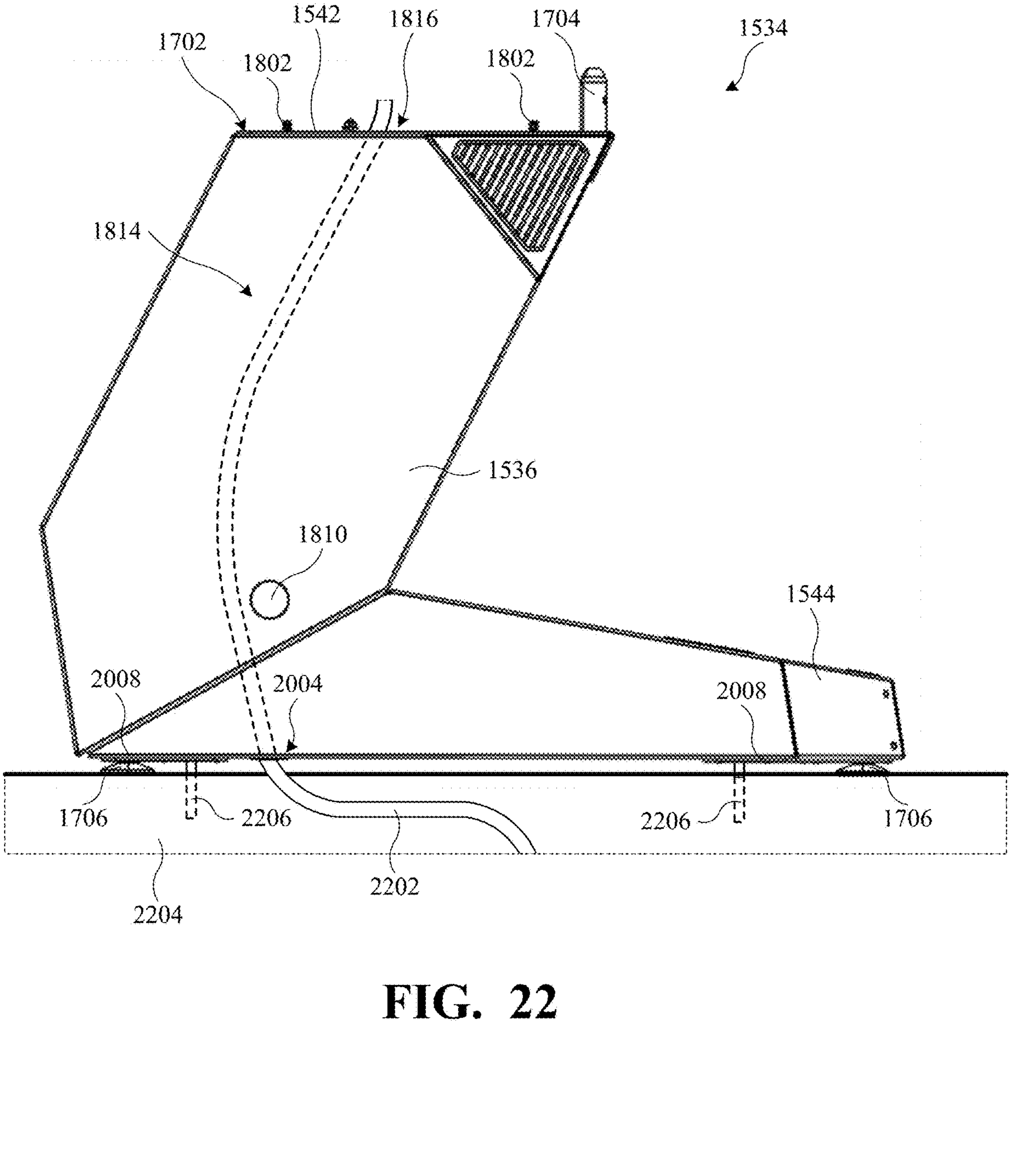
FIG. 22 is a side view of the stand illustrating routing of wiring through the stand.

FIG. 22 further illustrates a side view of the stand 1534 to show routing of wiring, such as the wiring 2202, through the first leg 1536. As shown in FIG. 22, the stand 1534—and thus the base station 1500—may be mounted to a platform 2204 (e.g., the ground or another surface), via anchors 2206 that extend through the plates 2008 coupled to the frame 1544 and into the platform 2204, thereby securing the base station 1500 to the platform 2204. The wiring 2202 may extend from beneath the platform 2204 or another location external to the base station 1500. As such, the wiring 2202 may be routed into the frame cavity 2002 through the first aperture 2004 of the frame 1544, through the frame cavity 2002 and into the first cavity 1814 of the first leg 1536 via the first opening 2104 of the frame 1544, and finally through the first aperture 1816 of the spreader plate 1702 to connect the wiring 2202 to the base 1502. Alternatively, the wiring 2202 may be routed directly into the first cavity 1814 of the first leg 1536 through the opening covered by one of the punchouts 1810 located on the first leg 1536.

Figure 23:
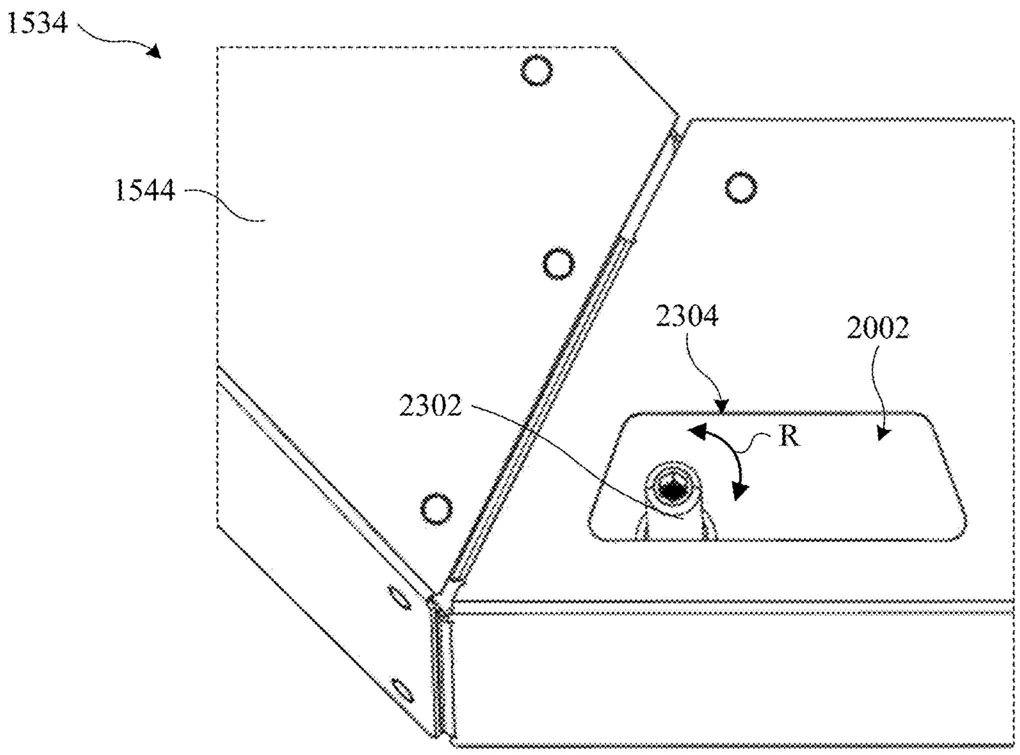
FIG. 23 is a close-up view of an adjustable foot of the stand.
Figure 24:
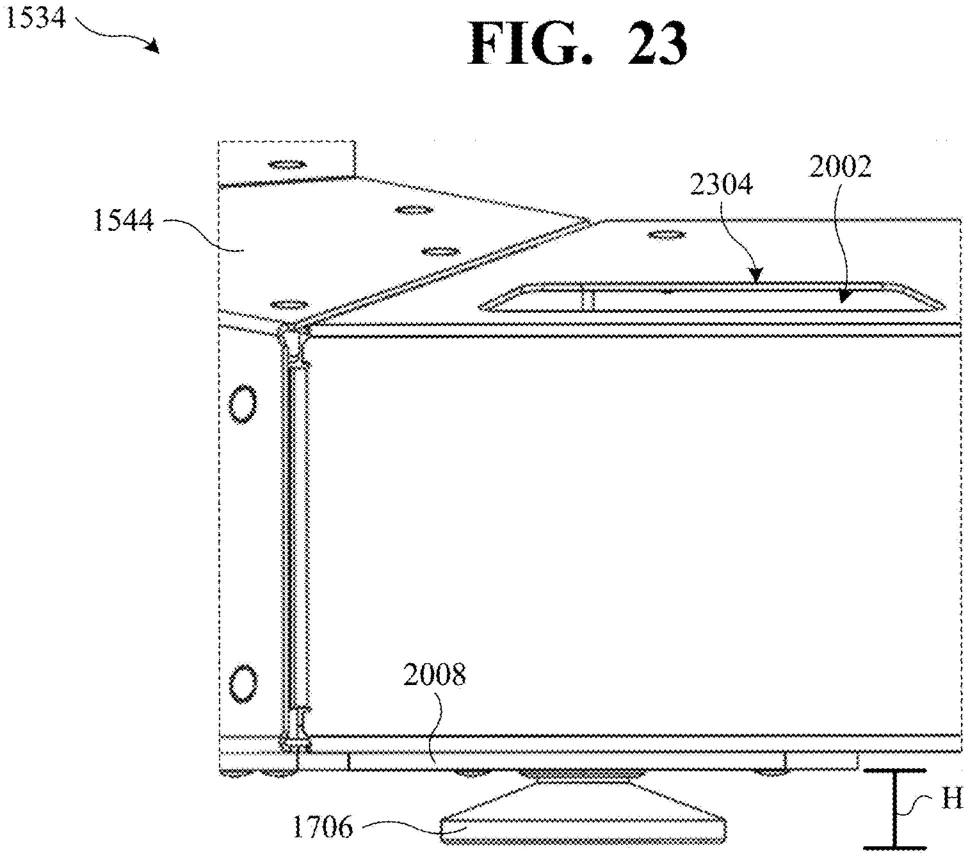
FIG. 24 is a side view of the adjustable foot of the stand.

FIG. 23 illustrates a close-up view of one of the adjustable feet 1706 of the stand 1534. FIG. 24 illustrates a side view of the adjustable foot shown in FIG. 23. It should be noted that the description of the adjustable foot shown in FIGS. 23 and 24 may also be applicable to any of the adjustable feet 1706 of the stand 1534 described herein.

The adjustable feet 1706 may be configured to adjust a height (H) of the stand 1534 with respect to the elevational direction 1506 of the base station 1500 to thereby adjust the overall height of the base station 1500 with respect to the ground or another surface (e.g., a platform). To facilitate such adjustment, each of the adjustable feet 1706 may include a spindle 2302, which may be rotated, such as in the direction (R), to increase and/or decrease the height (H) of the stand 1534. By way of example, the spindle 2302 of one of the adjustable feet 1706 shown in FIG. 23 may be located in the frame cavity 2002 of the frame 1544. As such, the spindle 2302 may be accessible through an opening defined by the frame 1544, such as an opening 2304, which may be covered by one of the access panels 1808 described above. As such, the spindle 2302 of all or a portion of the adjustable feet 1706 may be contained within the frame 1544, thereby protecting such mechanisms from environmental concerns (e.g., moisture and/or debris).

Persons skilled in the art will understand that the various embodiments of the disclosure described herein and shown in the accompanying figures constitute non-limiting examples, and that additional components and features may be added to any of the embodiments discussed herein above without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (i.e., an angle that lies within the range of (approximately) 135° to (approximately) 225°) and the term "generally orthogonal" should be understood as referring to configurations in with the pertinent components are oriented so as to define an angle therebetween that is equal to 90°±25% (i.e., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A base station for an unmanned aerial vehicle (UAV), comprising:
a base that includes:
a body; and
a landing platform supported by the body;
a roof assembly movably coupled to the base and movable between a closed position and an open position; and
a stand removably coupled to the base and that includes:
a first leg;
a second leg;
a frame extending between the first leg and the second leg; and
a spreader plate supported by at least one of the first leg and the second leg and that includes one or more guide pins that are received by the body of the base to align the base with the stand, wherein the base is secured to, and supported by, the spreader plate when the base is aligned with the stand,
wherein the stand is configured to support one or more of power transmission and data transmission to the base station via the stand.

2. The base station of claim 1, wherein the spreader plate defines an upper surface of the stand, and wherein a lower surface of the base abuts the upper surface of the spreader plate so that the base is supported by the stand.

3. The base station of claim 1, wherein the first leg defines a first cavity therein that is accessible through one or more openings defined by the first leg, and the second leg defines a second cavity therein that is accessible through one or more openings defined by the second leg.

4. The base station of claim 3, wherein the first cavity permits routing of wiring through the first leg to connect the wiring to the base station, and wherein the second cavity permits routing of additional wiring through the second leg to connect the additional wiring to the base station.

5. The base station of claim 4, wherein the wiring is configured to transmit power to the base station via the stand and the additional wiring is configured to transmit data to the base station via the stand.

6. The base station of claim 1, wherein the spreader plate includes a pair of guide pins that project away from an upper surface of the spreader plate.

7. The base station of claim 1, wherein the frame is spaced apart from the spreader plate in an elevational direction of the base station, and wherein the frame and the spreader plate extend along planes that are substantially parallel to one another.

8. The base station of claim 1, wherein the roof assembly is configured for positioning at least partially between the base and the stand when the roof assembly is in the open position.

9. A base station for an unmanned aerial vehicle (UAV), comprising:
a base configured to support the UAV; and
a stand coupled to the base and configured to support the base, wherein the stand includes:
a first leg defining a first cavity therein;
a second leg defining a second cavity therein;
a frame extending between the first leg and the second leg, wherein the frame defines a frame cavity therein that is accessible via one or more of the first cavity and the second cavity; and
a spreader plate coupled to and supported by the first leg and the second leg, wherein the spreader plate is coupled to the base to support the base thereon, and wherein the spreader plate defines one or more apertures that permit access to one or more of the first cavity of the first leg and the second cavity of the second leg.

10. The base station of claim 9, wherein wiring is routable through the stand to connect the wiring to the base by routing the wiring into the frame cavity, through the frame cavity, into the first cavity, and through the first cavity such that the wiring exits the first cavity through the one or more apertures of the spreader plate.

11. The base station of claim 9, wherein wiring is routable through the stand to connect the wiring to the base by routing the wiring into the frame cavity, through the frame cavity, into the second cavity, and through the second cavity such that the wiring exits the second cavity through the one or more apertures of the spreader plate.

12. The base station of claim 9, wherein the spreader plate defines:
a first aperture that permits access to the first cavity of the first leg; and
a second aperture that permits access to the second cavity of the second leg.

13. The base station of claim 9, wherein the first cavity is accessible via one or more openings defined by the first leg, and wherein the one or more openings are enclosed by one or more access panels.

14. The base station of claim 13, wherein the second cavity is accessible via one or more additional openings defined by the second leg, and wherein the one or more additional openings are enclosed by one or more additional access panels.

15. The base station of claim 9, wherein the frame defines a first opening and a second opening that permit access to the frame cavity, the first opening is aligned with the first leg such that the frame cavity is accessible through the first opening of the frame from within the first cavity of the first leg, and the second opening is aligned with the second leg such that the frame cavity is accessible through the second opening of the frame from within the second cavity of the second leg.

16. A stand for a base station for an unmanned aerial vehicle (UAV), comprising:
a first leg defining a first cavity therein;
a second leg defining a second cavity therein;
a spreader plate coupled to the first leg and the second leg, wherein the spreader plate is configured to support the base station; and
a frame extending between the first leg and the second leg, wherein the frame defines a frame cavity therein,
wherein wiring is routable through one or more of the first cavity, the second cavity, and the frame cavity to transmit one or more of power and data to the base station via the stand, and wherein the stand includes counterweighting such that the stand is configured to remain stationary when a roof assembly of the base station moves between a closed position and an open position with respect to the base station.

17. The stand of claim 16, wherein the first leg and the second leg extend substantially perpendicular to the frame and the spreader plate.

18. The stand of claim 16, wherein the first leg extends along a first axis and the frame extends along a second axis, and an angle between the first axis and the second axis is within a range of about 30 degrees to about 75 degrees.

19. The stand of claim 16, wherein the spreader plate defines an upper surface of the stand, and wherein the spreader plate includes a pair of guide pins that project away from the spreader plate and are receivable by the base station to align the base station with the stand.

20. The stand of claim 16, further comprising:

one or more adjustable feet configured to adjust a height of the stand with respect to an elevational direction, wherein the one or more adjustable feet each include a spindle that is located in the frame cavity and is rotatable to adjust the height of the stand.

21. A base station for an unmanned aerial vehicle (UAV), comprising:

a base that includes:

a body; and a landing platform supported by the body;

a roof assembly movably coupled to the base and movable between a closed position and an open position; and a stand removably coupled to the base and that includes:

a first leg that defines a first cavity therein that is accessible through one or more openings defined by the first leg;

a second leg that defines a second cavity therein that is accessible through one or more openings defined by the second leg;

a frame extending between the first leg and the second leg; and a spreader plate that is configured to support the base and that is supported by at least one of the first leg and the second leg, wherein the stand is configured to support one or more of power transmission and data transmission to the base station via the stand.

22. The base station of claim 21, wherein the first cavity permits routing of wiring through the first leg to connect the wiring to the base station, and wherein the second cavity permits routing of additional wiring through the second leg to connect the additional wiring to the base station.

23. The base station of claim 22, wherein the wiring is configured to transmit power to the base station via the stand and the additional wiring is configured to transmit data to the base station via the stand.

24. A base station for an unmanned aerial vehicle (UAV), comprising:

a base that includes:

a body; and a landing platform supported by the body;

a roof assembly movably coupled to the base and movable between a closed position and an open position; and a stand removably coupled to the base and that includes:

a first leg;

a second leg;

a frame extending between the first leg and the second leg; and a spreader plate that is configured to support that base and that is supported by at least one of the first leg and the second leg, wherein the frame is spaced apart from the spreader plate in an elevational direction of the base station, and the frame and the spreader plate extend along planes that are substantially parallel to one another, wherein the stand is configured to support one or more of power transmission and data transmission to the base station via the stand.

* * * * *